United States Patent
Baker

(10) Patent No.: US 10,376,849 B2
(45) Date of Patent: Aug. 13, 2019

(54) METHODS AND APPARATUS FOR CREATING TURBULENCE IN A THERMOSTATIC MIXING VALVE

(71) Applicant: Magarl, LLC, Naples, FL (US)

(72) Inventor: Thomas R. Baker, Noblesville, IN (US)

(73) Assignee: Magarl, LLC, Naples, FL (US)

( * ) Notice: Subject to any disclaimer, the term of this patent is extended or adjusted under 35 U.S.C. 154(b) by 12 days.

(21) Appl. No.: 15/362,095

(22) Filed: Nov. 28, 2016

(65) Prior Publication Data

US 2017/0259224 A1  Sep. 14, 2017

Related U.S. Application Data

(63) Continuation of application No. 13/657,218, filed on Oct. 22, 2012, now Pat. No. 9,504,970.

(60) Provisional application No. 61/550,396, filed on Oct. 22, 2011.

(51) Int. Cl.
*B01F 5/00* (2006.01)
*G05D 23/13* (2006.01)

(52) U.S. Cl.
CPC ......... *B01F 5/008* (2013.01); *G05D 23/1346* (2013.01)

(58) Field of Classification Search
CPC .... B01F 5/008; G05D 23/1346; G05D 23/13; G05D 23/1393; G05D 23/1306; G05D 23/1313
See application file for complete search history.

(56) References Cited

U.S. PATENT DOCUMENTS

| | | | |
|---|---|---|---|
| 2,287,810 A | 6/1942 | Lund |
| 2,317,717 A | 4/1943 | Bauman |
| 2,332,995 A | 10/1943 | Eaton |
| 2,519,381 A | 8/1950 | Kreske |
| 2,828,075 A | 3/1958 | Panza |
| 2,855,151 A | 10/1958 | Lesovsky |
| 2,893,637 A | 7/1959 | Trubert |
| 2,905,387 A | 9/1959 | Powell |
| 2,911,153 A | 11/1959 | Pett |
| 2,923,478 A | 2/1960 | Di Giulio |
| 3,001,717 A | 9/1961 | Kozel |
| 3,124,304 A | 3/1964 | Stuhl |

(Continued)

FOREIGN PATENT DOCUMENTS

| | | |
|---|---|---|
| EP | 297544 | 4/1989 |
| EP | 320564 | 8/1993 |

(Continued)

OTHER PUBLICATIONS

DE102007055455 publication dated May 14, 2009.*

(Continued)

*Primary Examiner* — Kun Kai Ma
(74) *Attorney, Agent, or Firm* — John V. Daniluck; Bingham Greenebaum Doll LLP

(57) ABSTRACT

Mixing valve turbulence generators and methods are disclosed. Embodiments include turbulence generation apparatuses and methods that increase the turbulence of, impart swirl to, reverse the direction of, create tortuous paths for, and/or accelerate the mixing of hot and cold fluid within a valve assembly. Alternate embodiments include angled radial slots, angled surfaces and fin-like baffles to enhance the mixing of hot and cold fluids.

26 Claims, 19 Drawing Sheets

(56) References Cited

U.S. PATENT DOCUMENTS

| | | |
|---|---|---|
| 3,388,861 A | 6/1968 | Harding |
| 3,685,728 A | 8/1972 | Chapou |
| 3,762,638 A | 10/1973 | Goldsmith |
| 3,827,016 A | 7/1974 | Knapp |
| 3,929,283 A | 12/1975 | Delpla |
| 3,938,741 A | 2/1976 | Allison |
| 4,082,219 A | 4/1978 | Rogers, Jr. et al. |
| 4,509,677 A | 4/1985 | Bendall |
| 4,607,788 A | 8/1986 | Bendall et al. |
| 4,711,392 A | 12/1987 | Kidouchi |
| 4,863,097 A | 9/1989 | Avelov |
| 4,979,530 A | 12/1990 | Breda |
| 5,011,074 A | 4/1991 | Kline |
| 5,033,671 A | 7/1991 | Shiba et al. |
| 5,161,737 A | 11/1992 | Olmsted |
| 5,174,496 A | 12/1992 | Bourgin |
| 5,203,496 A | 4/1993 | Kline |
| 5,323,960 A | 6/1994 | Kline |
| 5,340,018 A | 8/1994 | MacDonald |
| 5,341,987 A | 8/1994 | Ackroyd |
| 5,356,074 A | 10/1994 | Limet et al. |
| 5,379,936 A | 1/1995 | Kline |
| 5,427,312 A | 6/1995 | Simonov |
| 5,647,531 A | 7/1997 | Kline et al. |
| 5,738,275 A | 4/1998 | Enoki |
| 5,779,139 A | 7/1998 | Ueno |
| 5,971,285 A | 10/1999 | Knapp |
| 5,979,777 A | 11/1999 | Ems |
| 5,988,514 A | 11/1999 | Huang |
| 6,079,625 A | 6/2000 | Lubkuchner |
| 6,119,947 A | 9/2000 | Couture et al. |
| 6,186,481 B1 | 2/2001 | Pirkle |
| 6,250,559 B1 | 6/2001 | Knauss |
| 6,257,493 B1 | 7/2001 | Chamot et al. |
| 6,279,831 B1 | 8/2001 | Lorch |
| 6,286,764 B1 | 9/2001 | Garvey et al. |
| 6,290,139 B1 | 9/2001 | Kolze |
| 6,315,209 B1 | 11/2001 | Tripp |
| 6,328,219 B1 | 12/2001 | Taylor et al. |
| 6,405,932 B1 | 6/2002 | Palmer |
| 6,575,377 B1 | 6/2003 | Graves |
| 6,726,110 B2 | 4/2004 | Heinzelmann |
| 6,820,816 B1 | 11/2004 | Reid |
| 6,926,205 B2 | 8/2005 | Taylor et al. |
| 6,929,188 B2 | 8/2005 | Taylor et al. |
| 6,994,266 B2 | 2/2006 | Sadling |
| 7,140,394 B2 | 11/2006 | Eveleigh |
| 7,163,157 B2 | 1/2007 | Goncze et al. |
| 7,191,954 B2 | 3/2007 | Kline |
| 7,240,850 B2 | 7/2007 | Beck et al. |
| 7,344,088 B2 | 3/2008 | Yang |
| 7,448,553 B2 | 11/2008 | Schmitt |
| 7,475,827 B2 | 1/2009 | Schmitt |
| 7,665,671 B2 | 2/2010 | Cunningham et al. |
| 7,669,776 B2 | 3/2010 | Beck et al. |
| 7,673,808 B2 | 3/2010 | Mace et al. |
| 7,717,351 B2 | 5/2010 | Kline |
| 7,740,183 B2 | 6/2010 | Knapp |
| 7,744,007 B2 | 6/2010 | Beagen et al. |
| 7,832,651 B2 | 11/2010 | Rivlin |
| 7,850,088 B2 | 12/2010 | Wei et al. |
| 7,874,498 B2 | 1/2011 | Kempf |
| 7,913,926 B2 | 3/2011 | Goncze |
| 8,544,760 B2 | 10/2013 | Kline |
| 8,579,206 B2 | 11/2013 | Kline |
| 8,733,666 B2 | 5/2014 | Beagen |
| 2003/0019943 A1 | 1/2003 | Nember |
| 2004/0084541 A1 | 5/2004 | Eveleigh |
| 2006/0237549 A1 | 10/2006 | Caleffi |
| 2007/0194137 A1 | 8/2007 | Goacze |
| 2007/0221740 A1 | 9/2007 | Beck et al. |
| 2008/0257969 A1 | 10/2008 | Nember |
| 2009/0314844 A1 | 12/2009 | Mace |
| 2010/0123014 A1 | 5/2010 | Beagen |
| 2010/0219255 A1 | 9/2010 | Sansum et al. |
| 2010/0276500 A1 | 11/2010 | Rivlin |
| 2010/0314457 A1 | 12/2010 | Todaka |

FOREIGN PATENT DOCUMENTS

| | | |
|---|---|---|
| EP | 566433 | 10/1995 |
| EP | 0775954 | 5/1997 |
| EP | 1244948 | 2/2005 |
| EP | 2407849 | 1/2012 |
| GB | 2460878 | 12/2009 |
| WO | 9732147 | 9/1997 |
| WO | 2004068252 | 8/2004 |
| WO | 2010028790 | 3/2010 |
| WO | 2014072398 | 5/2014 |

OTHER PUBLICATIONS

U.S. Appl. No. 13/657,218, Office Action dated May 8, 2015, 8 pages.
U.S. Appl. No. 13/657,218, Response Filed Sep. 25, 2015, 14 pages.
U.S. Appl. No. 13/657,218, Final Action dated Dec. 15, 2015, 10 pages.
U.S. Appl. No. 13/657,218, Response filed Feb. 29, 2016, 12 pages.
U.S. Appl. No. 13/657,218, Advisory Action dated Apr. 7, 2016, 8 pages.
U.S. Appl. No. 13/657,218, Final Action dated Jun. 17, 2016, 9 pages.
U.S. Appl. No. 13/567,218, Response filed Jun. 20, 2016, 14 pages.
U.S. Appl. No. 13/567,218, Notice of Allowance dated Jul. 26, 2016, 12 pages.
Symmons Industries product information for Symmons TempControl. 2 pages, copyright 2011.
Symmons Industries Installation, Operation, and Service Instruction for Symmons TempControl, 4 pages, copyright 2011.
U.S. Appl. No. 13/403,593, NF Office Action dated Nov. 29, 2012, 6 pages.
Applicant Response, U.S. Appl. No. 13/403,593, filed Apr. 29, 2013, 13 pages.
U.S. Appl. No. 13/403,593, Notice of Allowance dated Jun. 11, 2013, 7 pages.
U.S. Appl. No. 13/221,376, NF Office Action dated Mar. 26, 2013, 5 pages.
Applicant Response, U.S. Appl. No. 13/221,376, filed Jun. 26, 2013, 10 pages.
U.S. Appl. No. 13/221,376, Notice of Allowance dated Jul. 17, 2013, 7 pages.

* cited by examiner

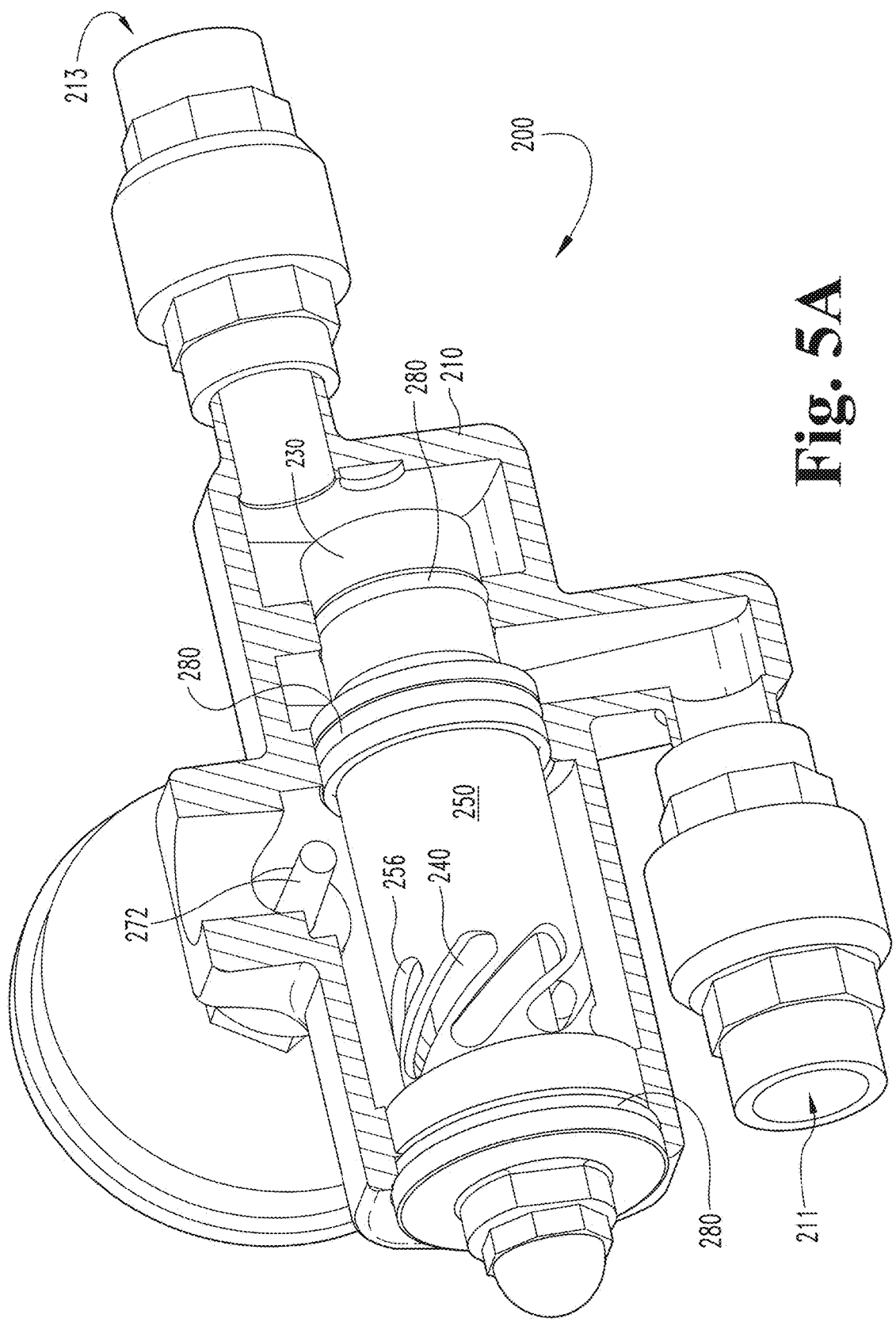

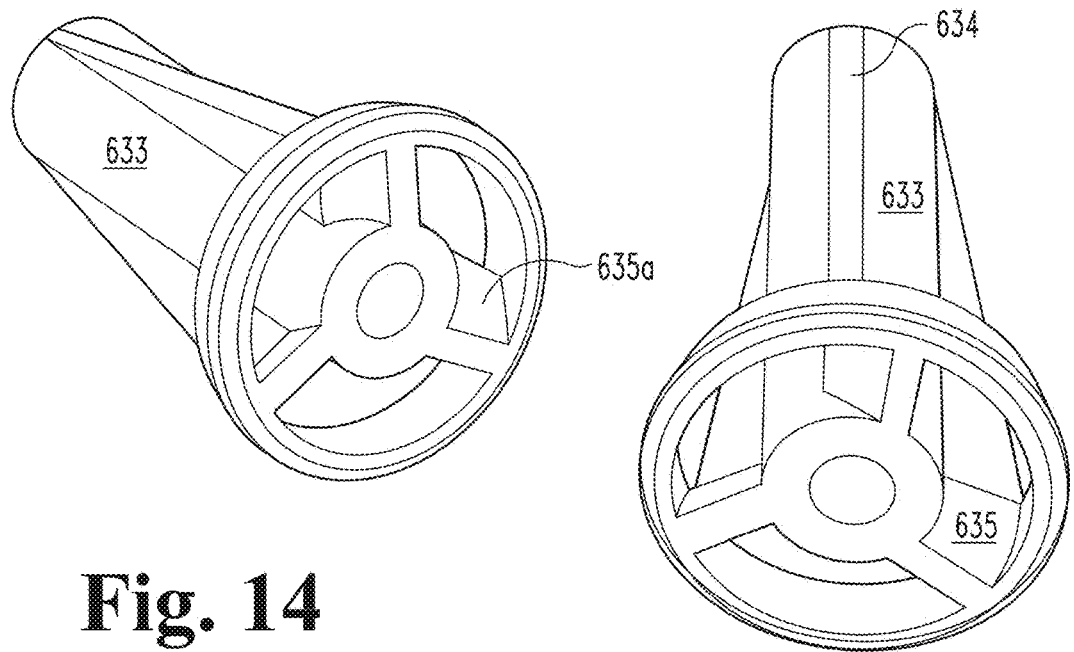
Fig. 14
Fig. 15
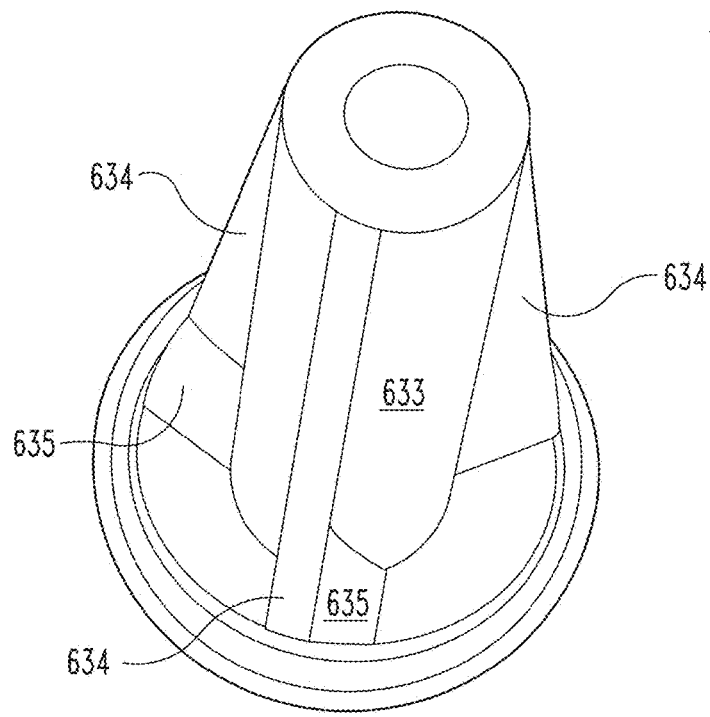
Fig. 16

METHODS AND APPARATUS FOR CREATING TURBULENCE IN A THERMOSTATIC MIXING VALVE

CROSS REFERENCE TO RELATED APPLICATIONS

This application is a continuation of U.S. patent application Ser. No. 13/657,218, filed Oct. 22, 2012, now issued as U.S. Pat. No. 9,504,970, claims the benefit of priority to U.S. Provisional Patent Application Ser. No. 61/550,396, filed Oct. 22, 2011, entitled MIXING VALVE TURBULENCE GENERATORS AND METHODS, incorporated herein by reference.

FIELD OF THE INVENTION

Various embodiments the present invention pertain to improvements in the mixing of multiple fluid streams within a body, and in particular to the mixing of hot and cold fluid streams in a thermostatically controlled valve.

BACKGROUND OF THE INVENTION

Mixing valves are generally used to mix a warmer fluid (hereinafter referred to as the "hot" fluid) with a cooler temperature fluid (hereinafter referred to as the "cold" fluid) to deliver a fluid at a desired temperature. Frequently the fluid being mixed is water. The fluid exiting the mixing valve is frequently at a temperature between the hot fluid and the cold fluid. However, the valve may also deliver fluid at a temperature equal to either the hot or cold fluid under various circumstances, such as when the hot fluid is at a temperature less than the desired temperature or the cold fluid is at a temperature greater than the desired temperature. Mixing valves optionally include fail-safe mechanisms that permit operation of the mixing valve in the event of certain failures. Some mixing valves include thermostats to automatically control the temperature of the fluid exiting the mixing valve, and can also include various fail-safe devices to prevent undesirable situations, such as thermostat failures. Example uses for temperature-controlled mixing valves include emergency eyewash stations and various water delivery fixtures in hospitals to prevent scalding.

Mixing valves typically include a hot fluid inlet, a cold fluid inlet and a mixing chamber that mixes the hot and cold fluid. However, hot and cold fluid have a tendency to remain separate unless mixing is induced within the valve assembly, which can be difficult to achieve in the relatively small amount of space available for mixing within a typical valve assembly.

What is needed are improvements in thermostatically controlled valves that provide improved mixing of hot and cold fluids. Various embodiments of the present invention do this in novel and unobvious ways.

SUMMARY OF THE INVENTION

Embodiments of the present invention provide improved mixing valve turbulence generators and methods. Other embodiments provide mixing of hot and cold fluids upstream of the mixed fluid outlet, while still other embodiments provide mixing of the hot and cold fluid upstream of the thermostat.

One aspect of the present invention pertains to an apparatus for controlling the mixing of multiple fluid streams. Some embodiments include first and second fluid inlets, a fluid outlet, a first chamber in fluid communication with the first and second inlets, and a second chamber in fluid communication with the fluid outlet. Other embodiments include a mixing valve and a thermostat operably coupled to the mixing valve to control the mixing of fluids from the first and second inlets, and including tubing containing a temperature responsive fluid, the tubing including a plurality of coil. Still other embodiments include a sleeve surrounding the thermostat, the sleeve having a sleeve inlet and a of sleeve outlet. Yet other embodiments of the thermostat include a first portion of the coils arranged with a first inner diameter, a second portion of the coils arranged with a second inner diameter greater than the first inner diameter, and a gap between the second portion and the thermostat is greater than a gap between the first portion and the thermostat.

Another aspect of the present invention pertains to an apparatus for controlling the mixing of multiple fluid streams including a thermostat having a central axis and operably coupled to the mixing valve to control the mixing of fluids, the thermostat including sealed tubing containing a temperature responsive fluid, the tubing including a plurality of coils spaced axially apart, and a sleeve surrounding the thermostat, the sleeve having a sleeve inlet and an outlet, wherein a first portion of the coils are spaced axially apart in a first, tighter spacing and a second portion of the coils are spaced axially apart in a second, looser spacing.

Yet other embodiments include a thermostat having a central axis and operably coupled to the mixing valve to control the mixing of fluids from the first and second inlets, the thermostat being located within the outlet chamber, the thermostat including sealed tubing containing a temperature responsive fluid, the tubing including a plurality of coils spaced axially apart about an axis. Still other embodiments include a sleeve surrounding the thermostat, the sleeve having a sleeve inlet for receiving fluid from the inlet chamber and a of sleeve outlet for providing fluid to the outlet chamber, wherein the thermostat and the sleeve define an annular flow passage therebetween, and the cross section area of the flow passage decreases in a direction along the sleeve from sleeve inlet to sleeve outlet.

This summary is provided to introduce some of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 5A is a perspective computer generated, partially cutaway view of a mixing valve assembly according to another embodiment of the present invention.

FIG. 14 is a perspective computer generated, partially cutaway view of a mixing valve assembly according to another embodiment of the present invention.

FIG. 15 is an alternate perspective view of the mixing assembly depicted in FIG. 14.

FIG. 16 is another perspective view of the mixing assembly depicted in FIG. 14.

DESCRIPTION OF THE PREFERRED EMBODIMENT

Figure 1:
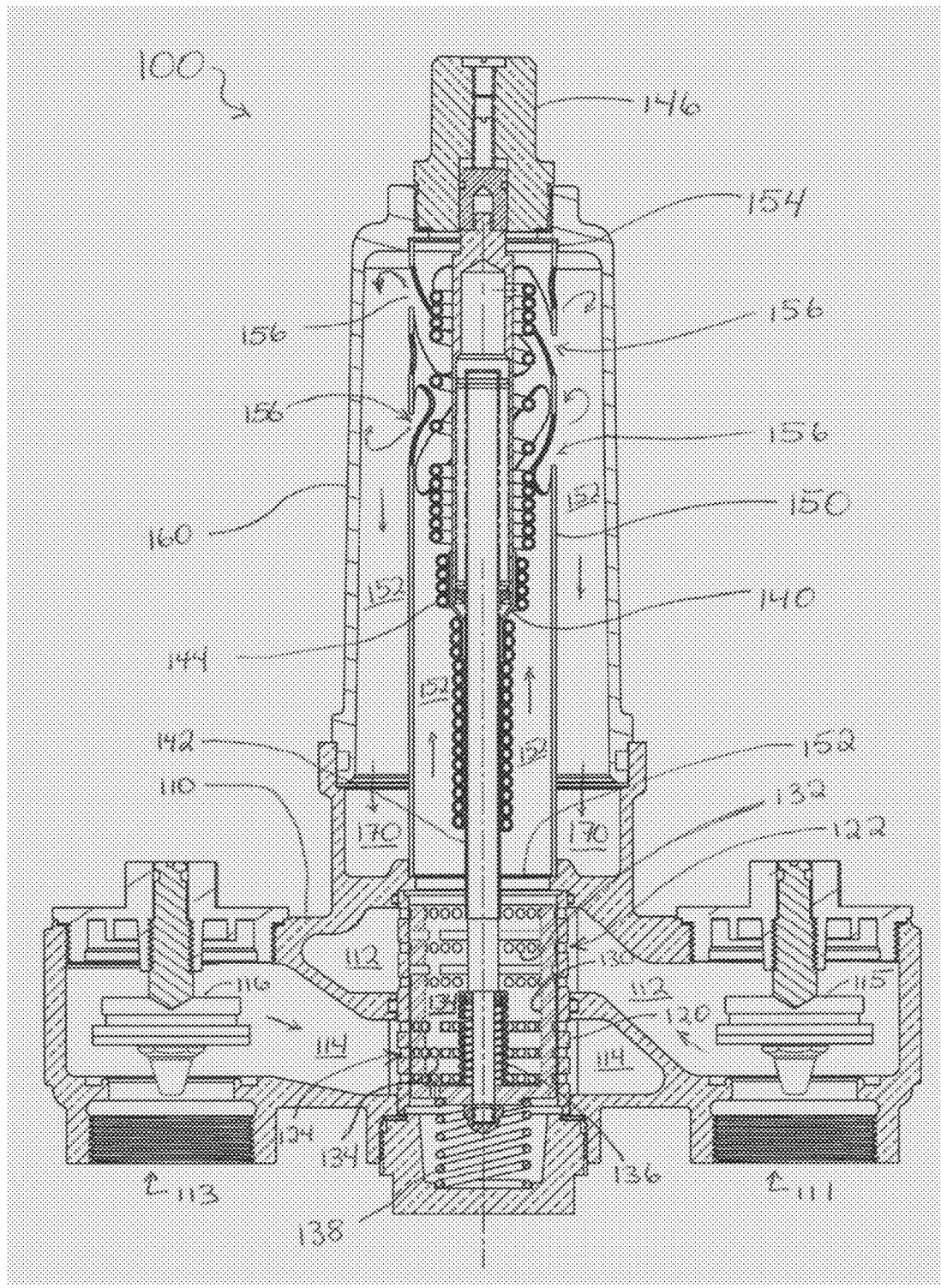
FIG. 1 is a front elevation sectional view of a mixing valve assembly according to one embodiment of the present invention.
Figure 2:
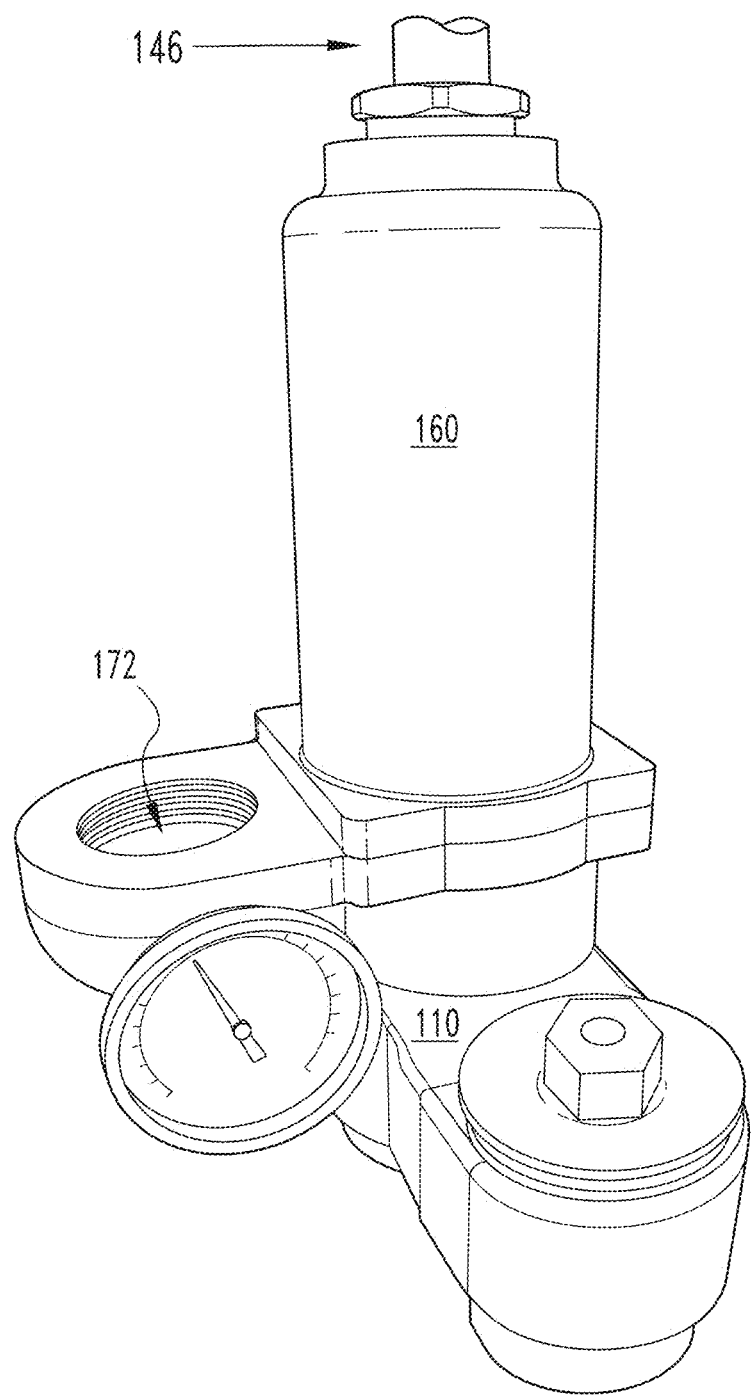
FIG. 2 is a perspective view of the mixing valve assembly depicted in FIG. 1 as expressed by a rapid prototyping fabrication process.
Figure 3:
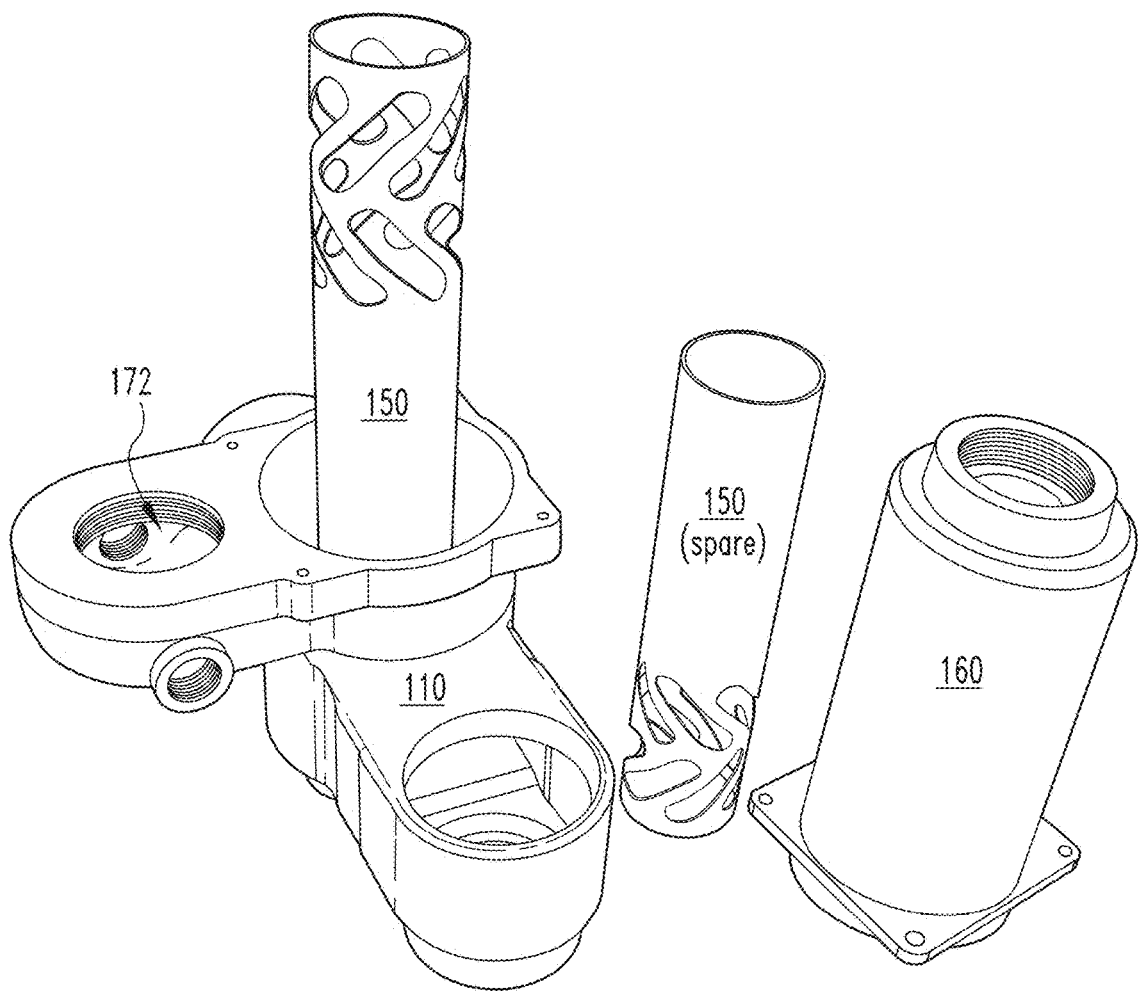
FIG. 3 is a perspective view of the mixing valve assembly depicted in FIG. 1 in a partially disassembled state as expressed by a rapid prototyping fabrication process.
Figure 4:
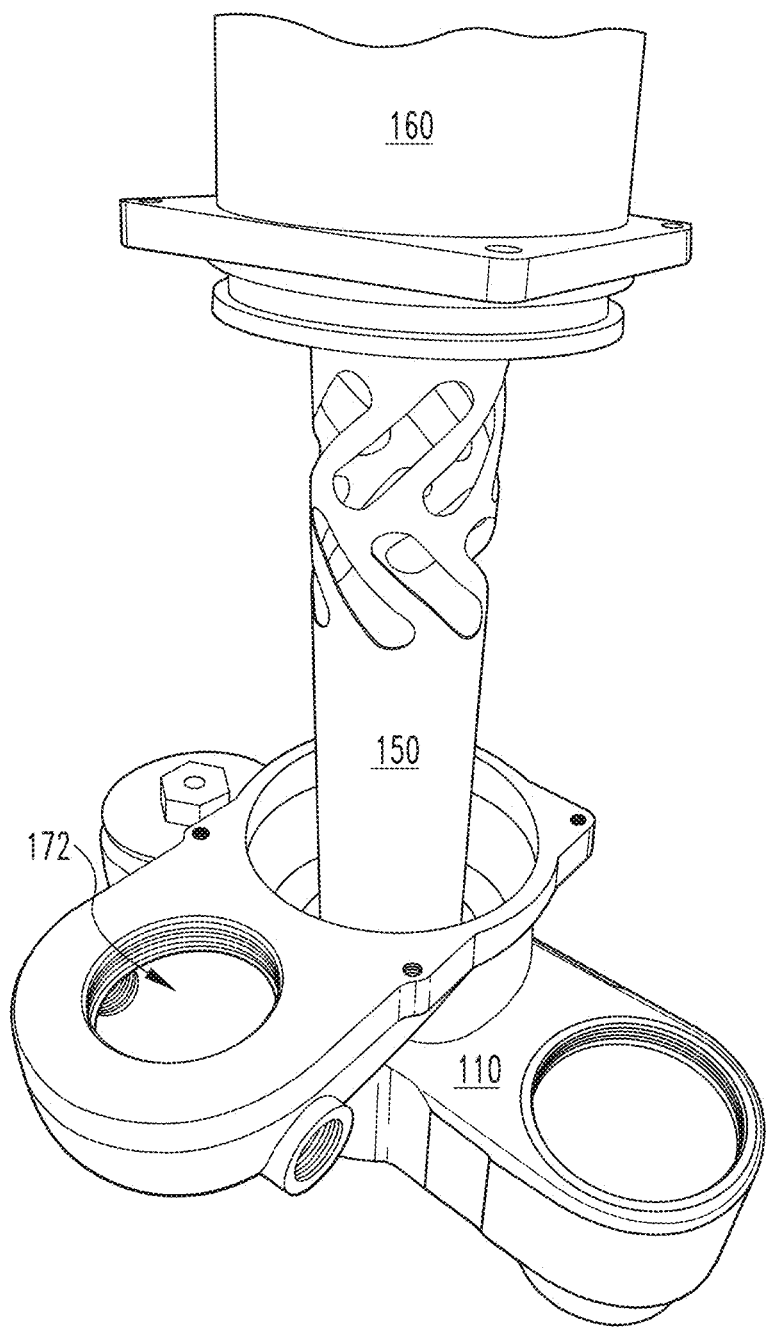
FIG. 4 is an alternate perspective view of the mixing valve assembly depicted in FIG. 1 in a partially disassembled state as expressed by a rapid prototyping fabrication process.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims.

The use of an N-series prefix for an element number (NXX.XX) refers to an element that is the same as the non-prefixed element (XX.XX), except as shown and described thereafter The usage of words indicating preference, such as "preferably," refers to features and aspects that are present in at least one embodiment, but which are optional for some embodiments. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. This description convention also applies to the use of prime ('), double prime ("), and triple prime ('") suffixed element numbers. Therefore, it is not necessary to describe the features of 20.1, 20.1', 20.1", and 20.1'" that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Various embodiments of the present invention pertain to methods and apparatus for inducing swirl in thermostatically controlled mixing valves. It is recognized that quick and efficient mixing of hot and cold streams is useful in such valves, providing safety and comfort to the valve users by preventing spikes of high or low temperature in the mixed fluid in the valve outlet, and further by quickly responding to the users request for temperature controlled fluid.

Various embodiments of the present invention address improved mixing of the hot and cold fluid streams at the various stages within the valve. Some embodiments are directed toward imparting motion, especially turbulent motion, to fluid received from a valve inlet, including before that fluid is mixed with fluid from another valve in. Yet other embodiments pertain to the creation of turbulence when the hot and cold fluids are brought together initially, before flowing past the thermostat. Yet other embodiments pertain to the creation of turbulence in fluid as it passes over the thermostat. Yet other embodiments pertain to the creation of turbulence in fluid as it exits the thermostat in before it flows out the valve outlet.

As used herein, it is understood that an overall concept is the turbulent mixing of two streams of fluid at different temperatures. Such turbulence can be imparted by swirling the fluid. Examples of such swirling include the use of turning vanes, and further the use of turning vanes to impart a spiral pattern to the fluid passing over the vanes. Yet other embodiments pertain to the use of flow orifices angled such that they provide flow from one of the inlets in a direction toward fluid from the other inlet in such a way that turbulent mixing occurs. Still further embodiments the present invention pertain to the use of ridge features over which the fluid flows, and over which turbulent eddies are created. In some embodiments such ridges are further angled to impart swirl, whereas in other embodiments the ridges are generally orthogonal or generally parallel to the direction of fluid flow.

One embodiment of the present invention pertains to an apparatus that controls the mixing of multiple streams of fluid, such as a thermostatically controlled mixing valve. In one embodiment, the apparatus includes a sleeve that surrounds the thermostat. Preferably, the sleeve includes at least one outlet that is adapted and configured to swirl fluid proximate to the thermostat as the fluid exits the sleeve.

In yet other embodiments, the thermostat includes a plurality of coils wrapped around the thermostat. Some of the coils are wrapped at a first pitch (coils per inch), and another portion of the coils are wrapped in a second, greater pitch. Preferably, the second portion of coils (which have a wider spacing between adjacent coils) are located proximate to the sleeve outlet.

And yet other embodiments the thermostat includes a central body, and a plurality of coils are wrapped around the body along a length of the body. A first portion of the coils is wrapped around the body with a first, tighter spacing, establishing a first gap between the inner diameter (ID) of the coils in the outer diameter (OD) of the body (which spacing in some embodiments can be close to zero, such as where the ID of the coils touches the OD of the body). A second portion of the coils placed along the length of the thermostat closer to the sleeve outlet are wrapped more loosely about the OD of the body, such that there is a gap between the ID of the coils and the OD of the body, the gap being sufficient to permit fluid to flow between the body and coil.

In still other embodiments, the thermostat and the sleeve cooperate to define an annular flow passage therebetween. This annular flow passage has a variable cross-section along the length of the thermostat, such that the cross-sectional area of the flow passage is greater toward the entrance of the sleeve, and decreases in a direction along the length toward the sleeve outlet. In some embodiments, the cross-sectional area decreases with the inner diameter of the sleeve being relatively constant, and the outer diameter of the thermostat increasing. In yet other embodiments, the outer diameter of the thermostat is relatively constant, and the inner diameter of the sleeve tapers from a large circular cross area (at the sleeve and let) to a smaller circular cross-sectional area (proximate to the sleeve outlet). In yet other embodiments, the annular cross-sectional area decreases as a result of an increase in the cross-sectional area occupied by tubing coiled around a thermostat body, such as where the tubing diameter increases, or where the inner diameter of the coil increases. Still further, yet other embodiments increase mixing and flow velocity along the length of the sleeve/thermostat assembly as a result of a combination of the aforementioned features.

Depicted in FIGS. 1-4 is a mixing valve assembly 100 according to one embodiment of the present invention. Mixing valve assembly 100 includes valve housing 110, liner 120, piston 130, thermostat 140, mixing sleeve 150 and housing cap 160.

Valve housing 110 includes cold fluid inlet 111, cold fluid inlet chamber 112, hot fluid inlet 113, and hot fluid inlet chamber 114. Cold inlet chamber 112 and hot inlet chamber 114 are each bounded by liner 120. In the illustrated embodiment, cold inlet chamber 112 and hot inlet chamber 114 are each annular chambers surrounding liner 120. Liner 120 includes at least one passage 122 adjacent cold inlet chamber 112 and at least one passage 124 adjacent hot inlet chamber 114.

Thermostatic control valve 100 further includes a pair of interchangeable check valves 115 and 116 that are in fluid communication with corresponding cold water and hot water inlets 111 and 113, respectively. Preferably, check valves 115 and 116 are interchangeable, such that check valve 115 can be positioned to be opposite of hot inlet 113, and vice versa. Further, the present invention contemplates those embodiments in which the check valves 115 and 116 are coupled to body or housing 110, such that the cooperating pair of a check valves and the opposing water inlet can be oriented in opposite manners. As one example, referring to FIG. 1, it can be seen that valve 100 is configured such that water flows into the bottom of valve 100, with the check valve placed on top of the inlet. In yet other embodiments of valve 100, the top and bottom thread patterns of body 110 are identical, such that the locations of the check valves and corresponding water inlets can be swapped.

Slidably positioned within liner 120 is piston 130. Piston 130 includes at least one passage 132 that aligns with passage 122 of liner 120 when piston 130 is appropriately positioned within liner 120 to permit the flow of cold fluid from cold inlet chamber 112, through passages 122 and 132, and into the passage within piston 130. Piston 130 further includes at least one passage 134 that aligns with the at least one passage 124 in liner 120 when piston 130 is appropriately positioned within liner 120 to permit the flow of hot fluid from hot inlet chamber 114, through passages 124 and 134, and into the fluid passage within piston 130.

Piston 130 is connected to thermostat rod 142 of thermostat 140. An over travel spring 136 and a bias spring 138 are also connected to piston 130 to provide appropriate operation of thermostat 140 and piston 130.

Thermostat 140 is filled with temperature sensitive fluid and includes thermostat rod 142 and thermostat coils 144. As the temperature of thermostat 140 increases, the temperature sensitive fluid within thermostat 140 expands and generates a force to extend thermostat rod 142. Positioned atop thermostat 140 is thermostat adjustment knob 146, which is used to adjust the set temperature of the mixing valve.

Surrounding thermostat 140 is mixing sleeve 150. Mixing sleeve 150 resembles a hollow tube which is open at the upstream end 152 (lower portion of sleeve 150 as depicted in FIG. 1). The bottom portion 152 of mixing sleeve 150 is in fluid communication with the interior region of piston 130. Mixing sleeve 150 is closed at the downstream end 154 (upper portion of sleeve 150 as depicted in FIG. 1). Mixing sleeve 150 also includes angled radial slots 156 located between upstream end 152 and downstream end 154. In the illustrated embodiment, slots 156 are located adjacent downstream end 154. Surrounding at least a portion of mixing sleeve 150 is housing cap 160, which is attached to valve housing 110. Located near the location where cap 160 and valve housing 110 attach to one another is mixed fluid outlet chamber 170, which is in communication with mixed fluid outlet 172.

In use, cold fluid inlet 111 is connected to a cold fluid source, and hot fluid inlet 113 is connected to a hot fluid source. Cold fluid shut off valve 115 and hot fluid shut off valve 116 may be used to stop the supply of cold or hot fluid, respectively, although valves 115 and 116 are generally left in the open position during normal operation. An outlet valve (not depicted) is typically positioned at mixed fluid outlet 172, and when the outlet valve is opened, fluid flows through mixing valve assembly 100 according to the control parameters designed into mixing valve assembly 100, which may include various safety states that occur in the event of valve component failure.

At an appropriate temperature, thermostat 140 positions piston 130 within liner 120 such that piston passages 132 align with liner passages 122 and piston passages 134 align with liner passages 124. In this situation, fluid enters the interior portion of piston 130 from cold inlet chamber 112 and hot inlet chamber 114. However, hot and cold fluids tend to resist mixing and will generally exit the interior portion of piston 130 and enter the interior portion of mixing sleeve 150 without fully mixing.

As the fluid continues along the interior of mixing sleeve 150, the hot and cold fluid encounter angled radial slots 156, which assist in the mixing of the hot and cold fluid. Although the angled radial slots 156 are depicted as being helical, other embodiments utilize differently shaped slots to enhance the mixing of hot and cold fluid.

The angled radial slots impart both a swirling motion (due to their being angled) and a radial motion (due to the fluid flowing outward through the slots) to the fluid to create turbulence and enhance the mixing of the hot and cold fluid as the fluid travels from the interior of mixing sleeve 150 to the exterior of mixing sleeve 150 through the angled radial slots 156. One set 156*a* of angled radial slots impart a swirling motion to the fluid in one direction, and the other set 156*b* of angled radial slots imparts a swirling motion to the fluid in another direction to enhance the mixing. After exiting through slots 156, the fluid travels along the passage between the exterior of mixing sleeve 150 and the interior of housing cap 160 toward mixed fluid outlet chamber 170. The mixed fluid exits mixing valve assembly 100 through mixed fluid outlet port 172.

Figure 5B:
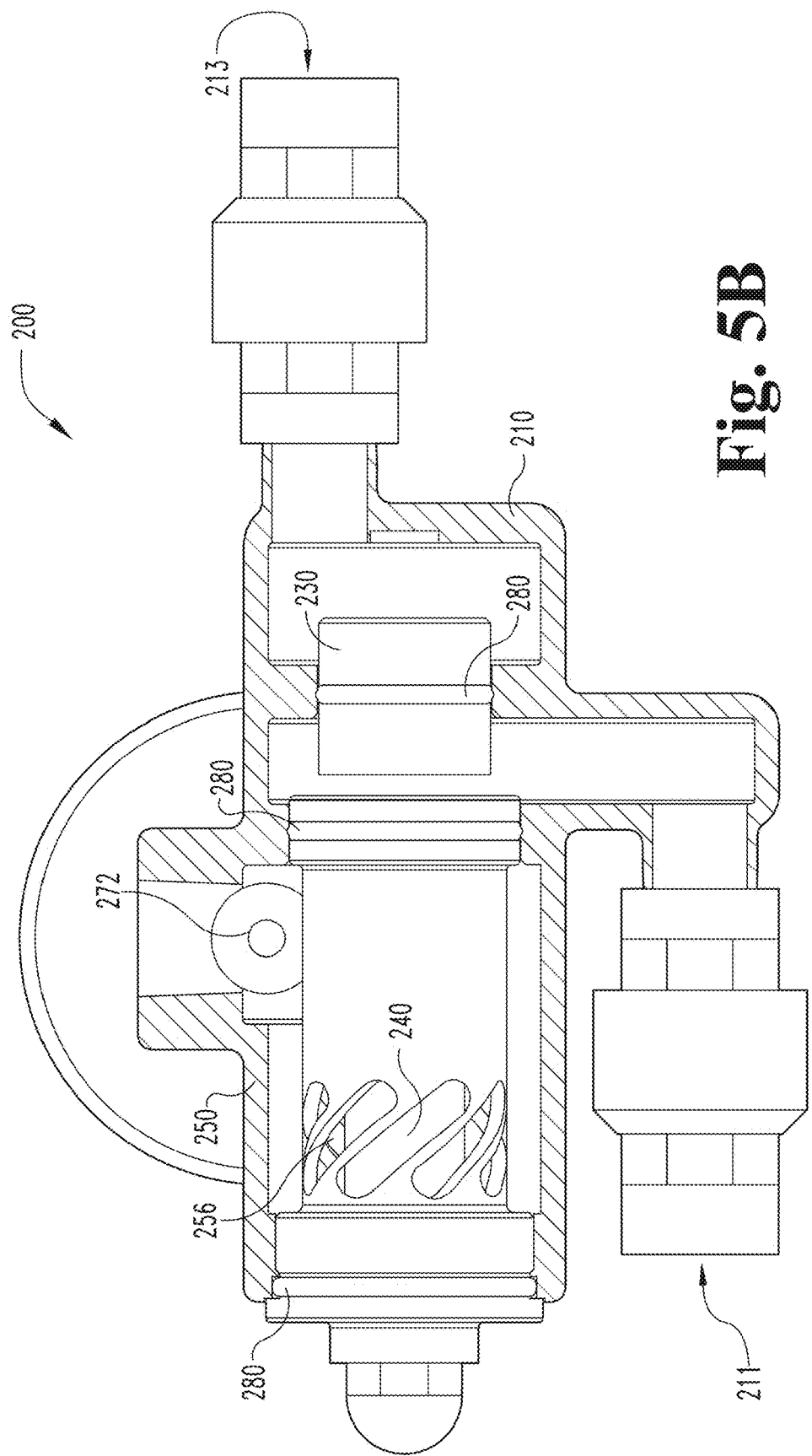
FIG. 5B is a side elevational partial cutaway view of the mixing valve assembly of FIG. 5A.
Figure 6A:
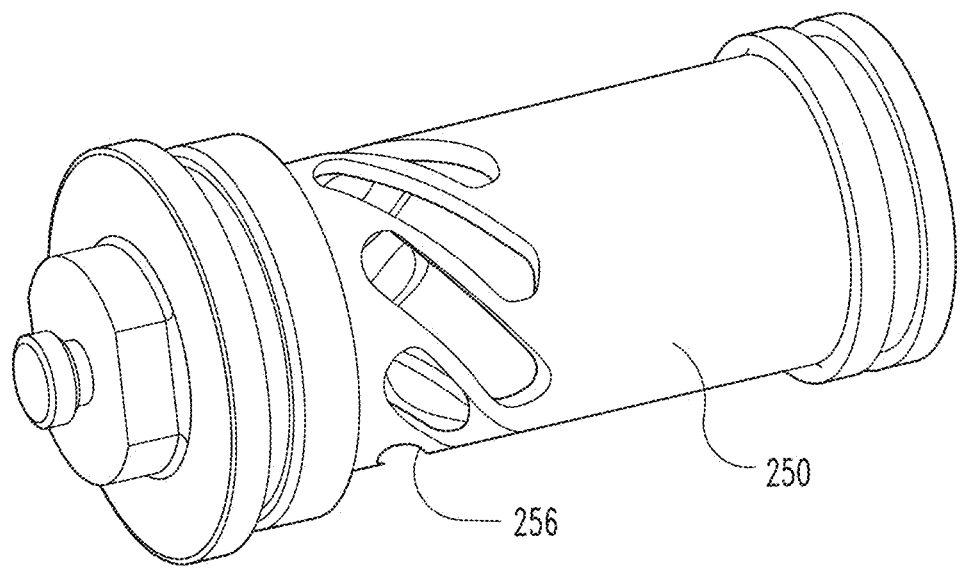
FIG. 6A is a perspective view of a portion of the mixing valve assembly depicted in FIG. 5.
Figure 6B:
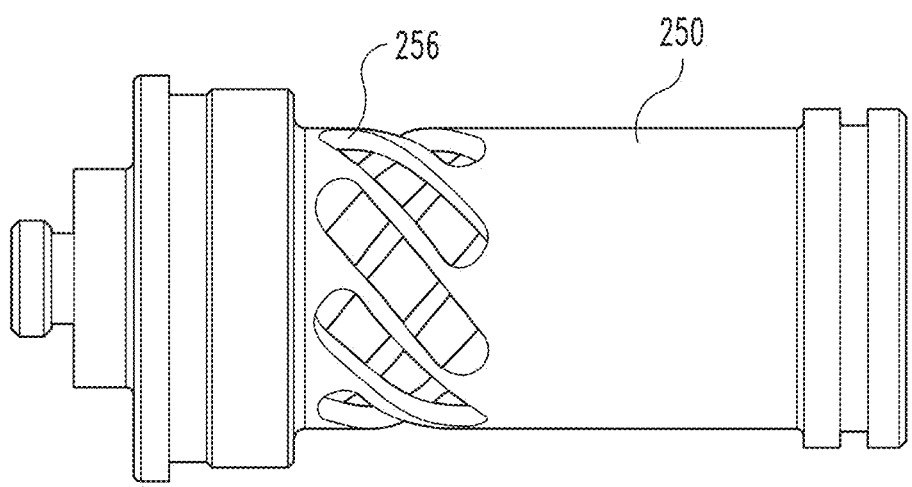
FIG. 6B is a side elevational view of the apparatus of FIG. 6A.

Depicted in FIGS. 5 and 6 is a mixing valve assembly 200 according to another embodiment of the present invention. Mixing valve assembly 200 includes valve housing 210, piston 230 which is operatively connected to thermostat 240, and mixing sleeve 250. Valve housing 210 includes cold fluid inlet port 211, hot fluid inlet port 213, and mixed fluid outlet 272. Mixing sleeve 250 includes angled radial slots 256, and various O-rings 280 are used in conjunction with piston 230 and mixing sleeve 250 to restrict the flow of fluid to the appropriate pathways.

In use, the amount of hot and cold fluid entering into the interior of mixing sleeve 250 from cold inlet port 211 and hot inlet port 213 is controlled by the position of piston 230, which is attached to thermostat 240 and moves within valve housing 210 in response to the temperature of the fluid flowing over thermostat 240. As the fluid passes beyond piston 230 and enters into the interior portion of mixing sleeve 250, the hot and cold fluid may begin to partially mix; however, these fluids tend to remain unmixed within the short distance that the fluid flows through mixing valve assembly 200 unless active mixing is introduced into the fluid stream.

As the hot and cold fluid reach angled radial slots 256, the hot and cold fluids begin to swirl due to the arrangement of the angled radial slots 256. As the hot and cold fluids exit through radial slots 256, the fluid also moves outwardly in the radial direction. The combination of the swirling and the radial flow assists in generating turbulence, which assists in mixing the hot and cold fluids. Due to the turbulence induced by the slots 256, the hot and cold fluids continue to mix as they travel along the exterior of mixing sleeve 250 and toward the mixed fluid outlet 272.

Figure 7:
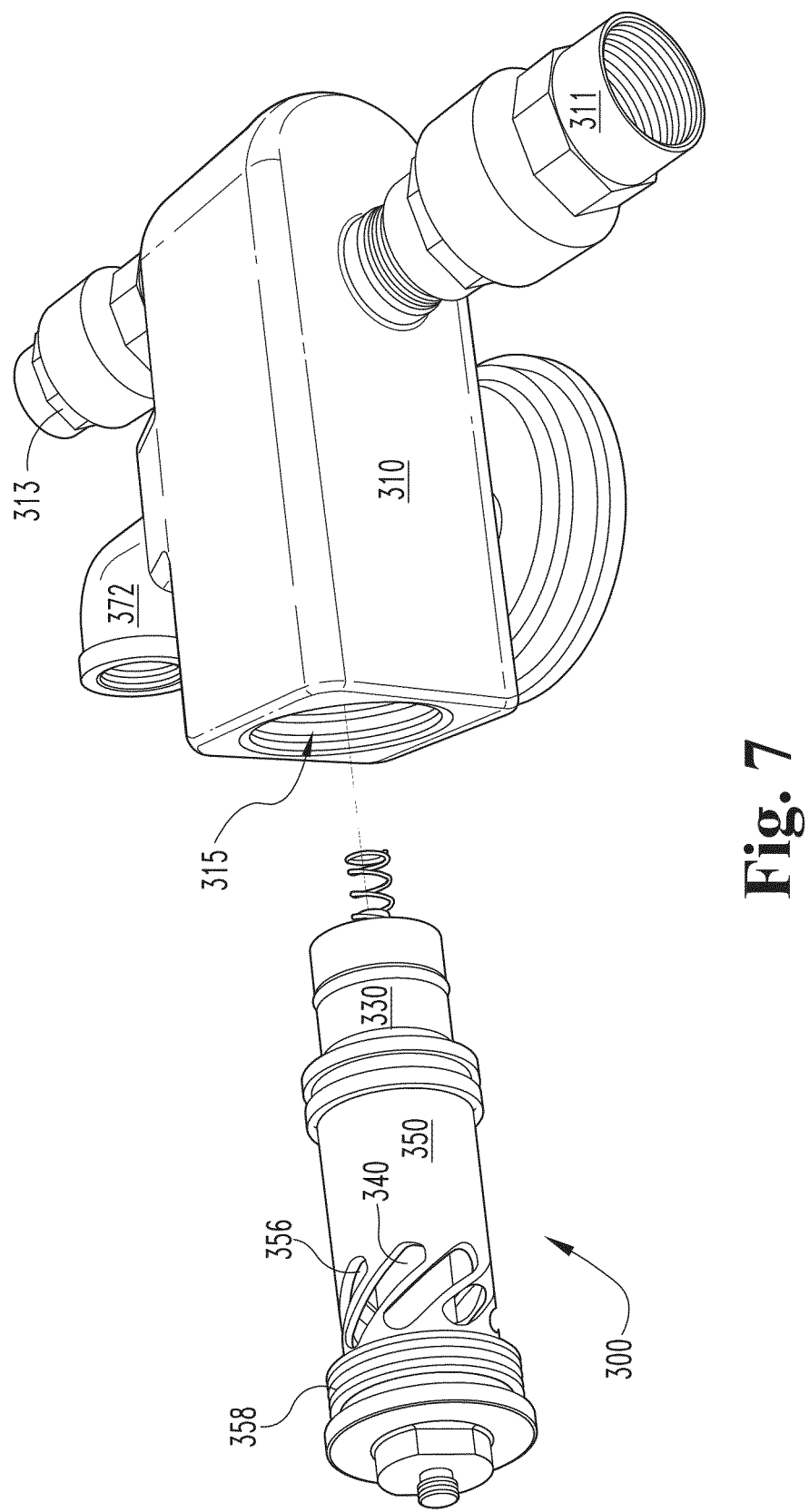
FIG. 7 is a mixing valve assembly in a partially disassembled state according to yet another embodiment of the present invention as expressed by a rapid prototyping fabrication process.
Figure 8:
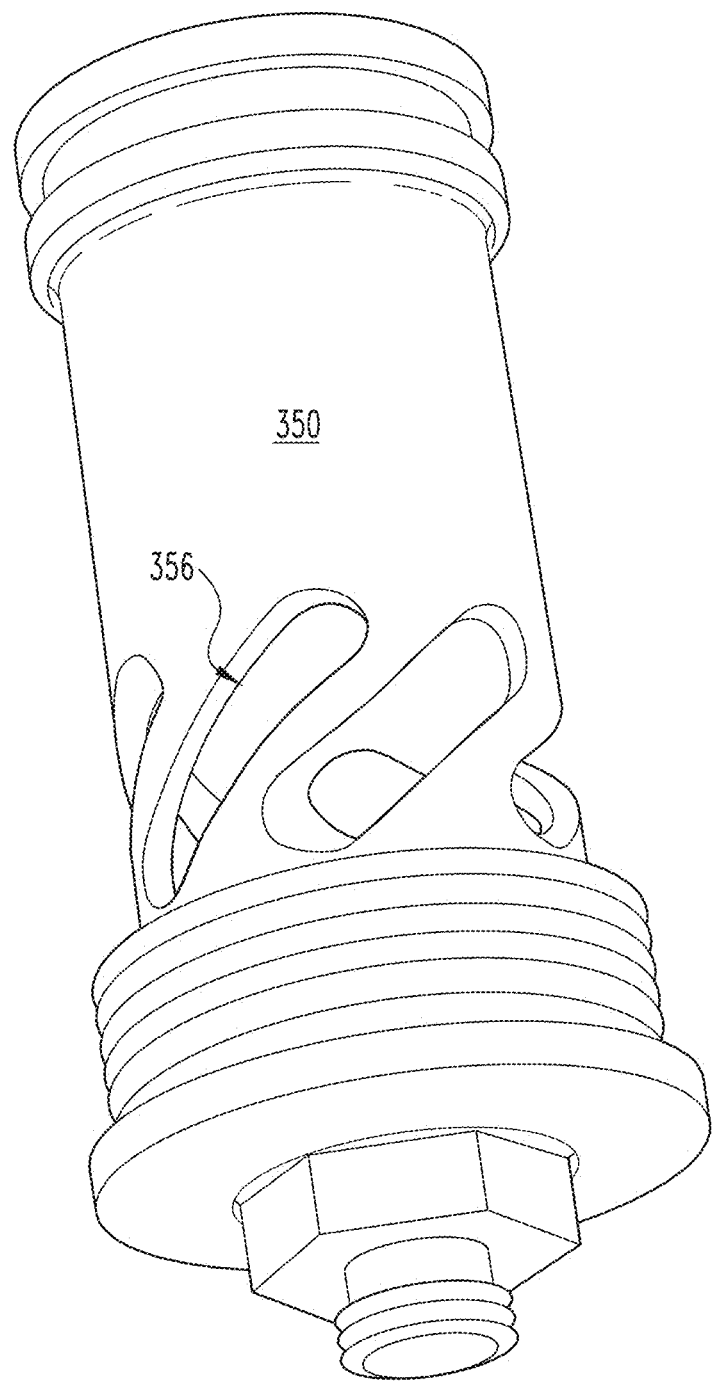
FIG. 8 is a perspective view of a portion of the mixing valve assembly depicted in FIG. 7 as expressed by a rapid prototyping fabrication process.
Figure 9:
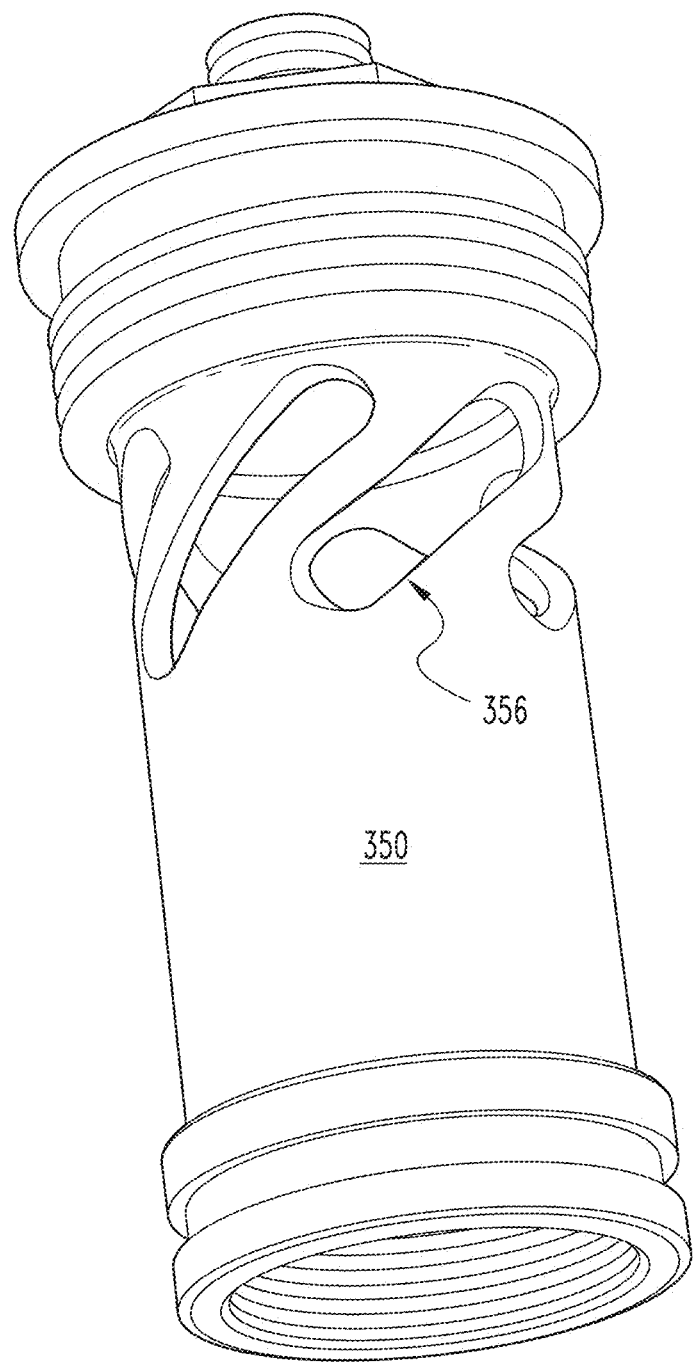
FIG. 9 is an alternate perspective view of the portion of the mixing valve assembly depicted in FIG. 8 as expressed by a rapid prototyping fabrication process.

Depicted in FIGS. 7, 8, and 9 is a mixing valve assembly 300 according to a further embodiment of the present invention. Mixing valve assembly 300 includes valve housing 310 (which includes cold inlet port 311 and hot inlet port 313), piston 330, which is operatively attached to thermostat 340, and mixing sleeve 350 (which includes angled radial slots 356 and threads 358). To install mixing sleeve 350, thermostat 340 and piston 330 into valve housing 310, the three items are inserted through opening 315 with threads 358 mating with the threads on opening 315. Mixing sleeve 350 is then rotated to fully engage threads 358 with the threads in opening 315 and secure mixing sleeve 350 within valve housing 310.

In use, piston 330 proportionally controls the hot fluid entering through hot fluid entry port 313 and the cold fluid entering through cold fluid inlet port 311. Once progressing past piston 330, the hot and cold fluid travel in the space between thermostat 340 and the interior of mixing sleeve 350 and move toward angled radial slots 356. As the fluid approaches angles radial slots 356, the fluid begins to swirl in response to the helical nature of the angled radial slots 356 and also begins to move radially outward through slots 356. The swirling motion of the hot and cold fluid, especially when combined with the radial movement, induces turbulence and mixes the hot and cold fluid to provide a fluid with a uniform temperature exiting mixed fluid outlet 372.

Yet other embodiments of the present invention pertain to a thermostatic mixing valve in which a sliding piston is adapted and configured to create turbulence within it, and in yet other embodiments to create turbulence in fluid outside of the piston.

In one embodiment, there is a generally cylindrical, hollow piston that includes a swirling feature on one end of the piston. This end of the piston is located near a fluid inlet, and as fluid from the inlet flows into the piston, swirl is imparted by this feature to the fluid, such that the fluid within the interior of the piston swirls as it flows from one end into the piston to the other end of the piston.

In yet another embodiment, a generally cylindrical, hollow piston includes a swirling feature on an end of the piston proximate to a fluid inlet. This end of the piston includes a lip that cooperates with a static seal 434.6 to modulate (or meter) fluid flowing between the piston lip and the seal. The piston is operably attached to a thermostat, and the position of the lip relative to the seal (forming a flow annulus) is established by the length of the thermostat. As fluid flows within this annular slit and toward an outlet chamber, the swirling features located on the piston impart swirl to this metered fluid. In still further embodiments, the other end of the piston likewise includes a lip that cooperates with a static seal 434.5, both located distally from the thermostat, to modulate or meter flow going into the interior of the piston.

In still further embodiments, the aforementioned inlet swirling feature and the aforementioned exit swirling feature are combined on the same piston, with the result that fluid entering the entrance to the piston interior has swirl imparted to it, and as the same fluid exits the swirling exit feature, it is combined with fluid flowing through the annular metering. In some embodiments, the entrance swirling feature and the exit swirling feature are identical. In yet other embodiments, the entrance swirling feature is adapted and configured to swirl fluid in a first direction (such as the fluid within the interior piston), and the exit swirling feature is adapted and configured to impart swirl in the opposite direction to that same fluid.

Figure 10A:
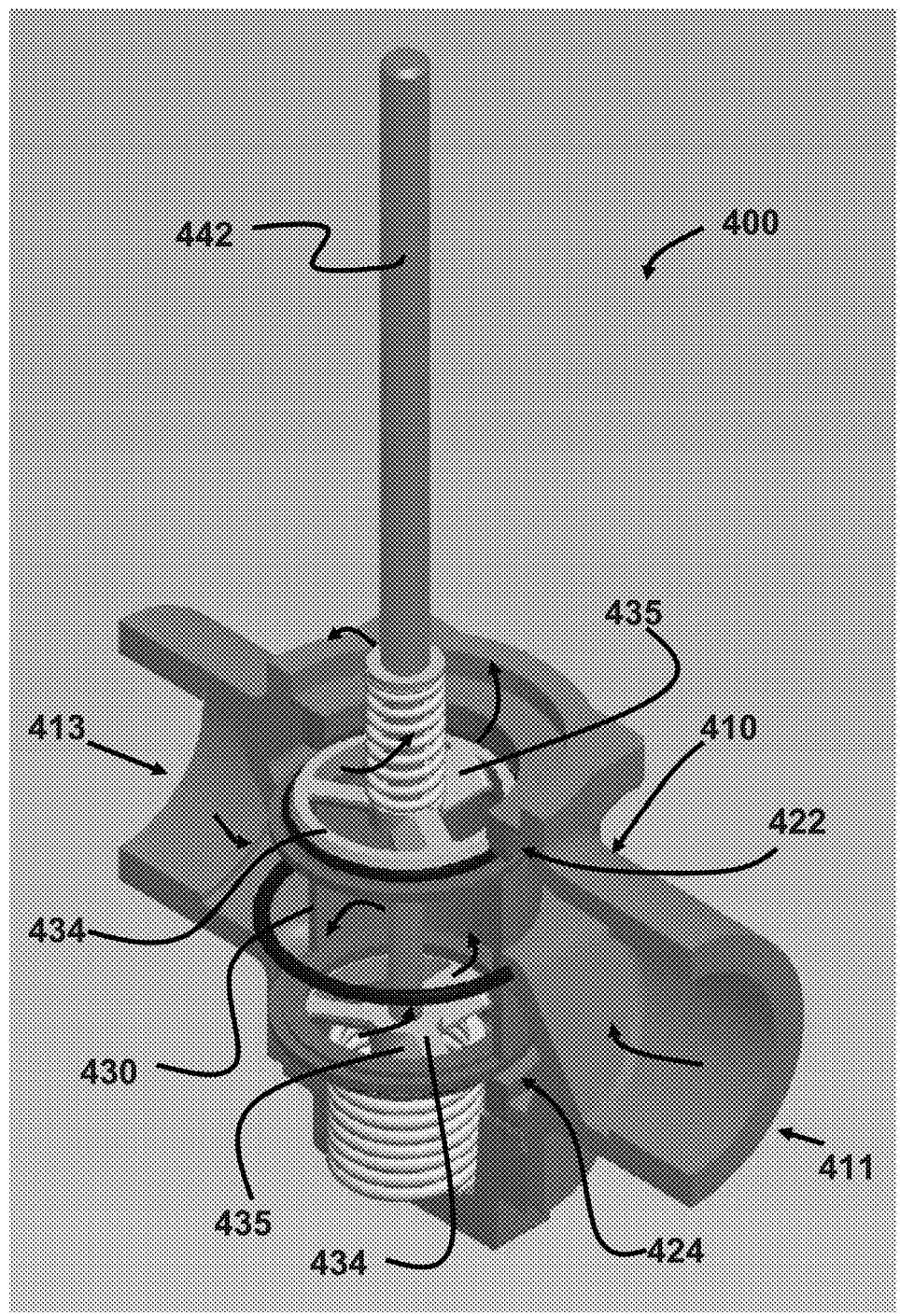
FIG. 10A is a perspective view of a mixing valve assembly according to still another embodiment of the present invention.
Figure 10B:
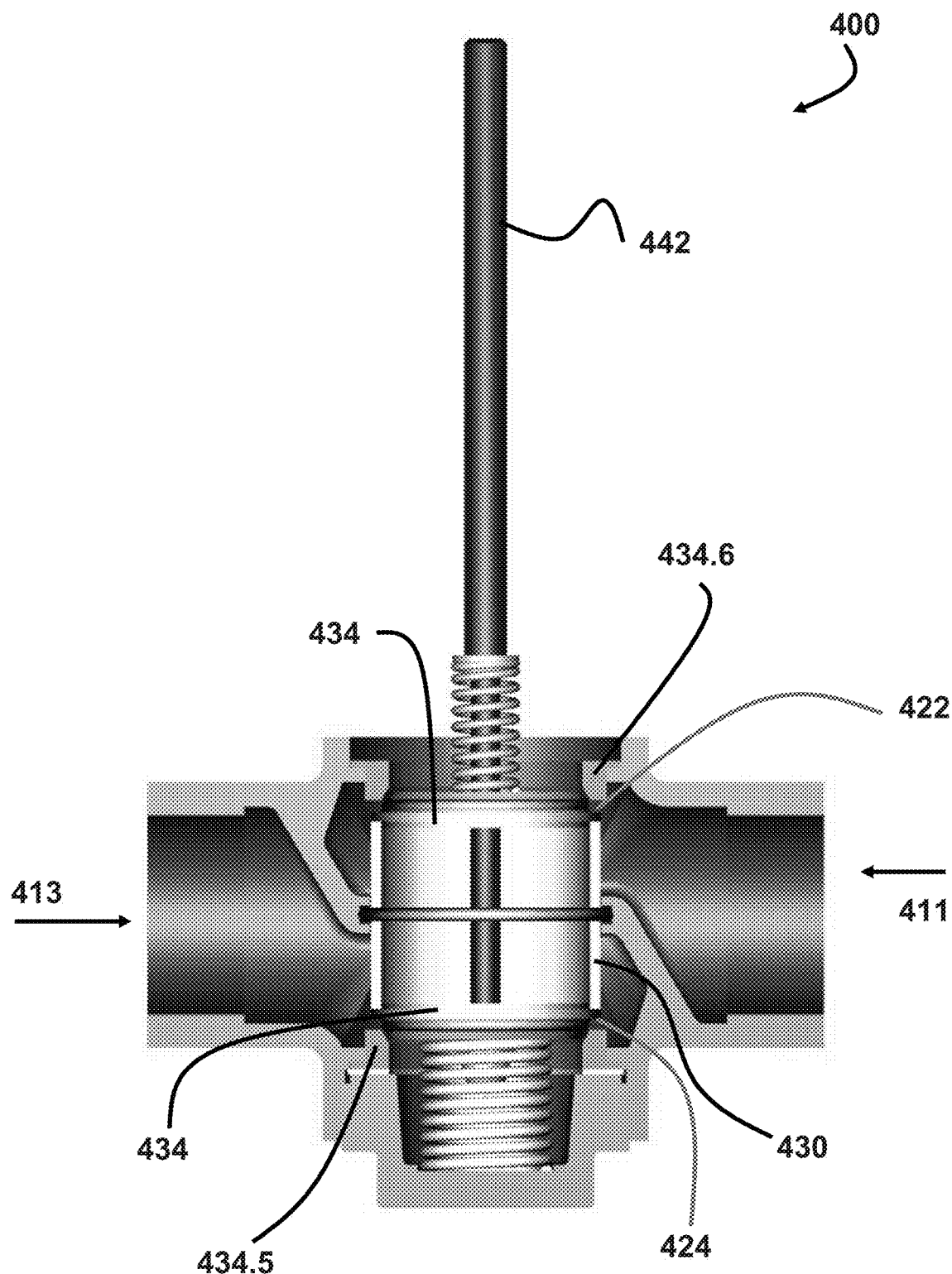
FIG. 10B is a side elevational view of the apparatus of FIG. 10A.

Depicted in FIGS. 10A and 10B is a mixing valve assembly 400 according to yet another embodiment of the present invention. Mixing valve assembly 400 includes valve housing 410 (which includes cold fluid inlet 411 and hot fluid inlet 413), piston 430, turbulence generating members 434 (which include angled surfaces 435), and thermostat rod 442 (which is actuated by a thermostat that is not depicted for the sake of clarity). Piston 430 is depicted in a partial cutaway to facilitate a clearer view of the lower turbulence generator 434.

In use, hot fluid enters into the interior region of piston 430 (depending on the position of piston 430 within valve housing 410) through hot fluid inlet port 424. After the hot fluid passes through hot fluid inlet port 424, the hot fluid moves upward (as depicted in FIG. 10) through the lower turbulence generator 434 and into the interior of piston 430. The hot fluid begins swirling when the hot fluid passes angled surfaces 435 and continues swirling as the hot fluid passes the angled surfaces 435 of the upper turbulence generator 434, which imparts an additional swirling to the hot fluid. Cold fluid enters above piston 430 (when piston 430 is positioned within valve housing 410 to permit the flow of cold fluid) through cold fluid inlet 422. As the cold fluid passes cold fluid inlet 422, the cold fluid begins to mix with the swirling hot fluid. Turbulence is created as the swirling hot fluid interacts with the non-swirling (or at least less swirling) cold fluid, assisting in the mixing of the hot and cold fluid. Mixing continues as the hot and cold fluid travel upward (as depicted in FIG. 10) beyond piston 430.

Although the angled surfaces 435 of the upper and lower turbulence generators 434 are depicted as imparting a swirling motion to the fluid in the same direction, alternate embodiments have the angled surfaces arranged such that the lower turbulence generator 434 tends to swirl the hot fluid in one direction while the upper turbulence generator 434 tends to swirl the hot fluid in the opposite direction. Alternate embodiments also include a lower turbulence generator and no upper turbulence generator, while still other embodiments include an upper turbulence generator and no lower turbulence generator.

Figure 11:
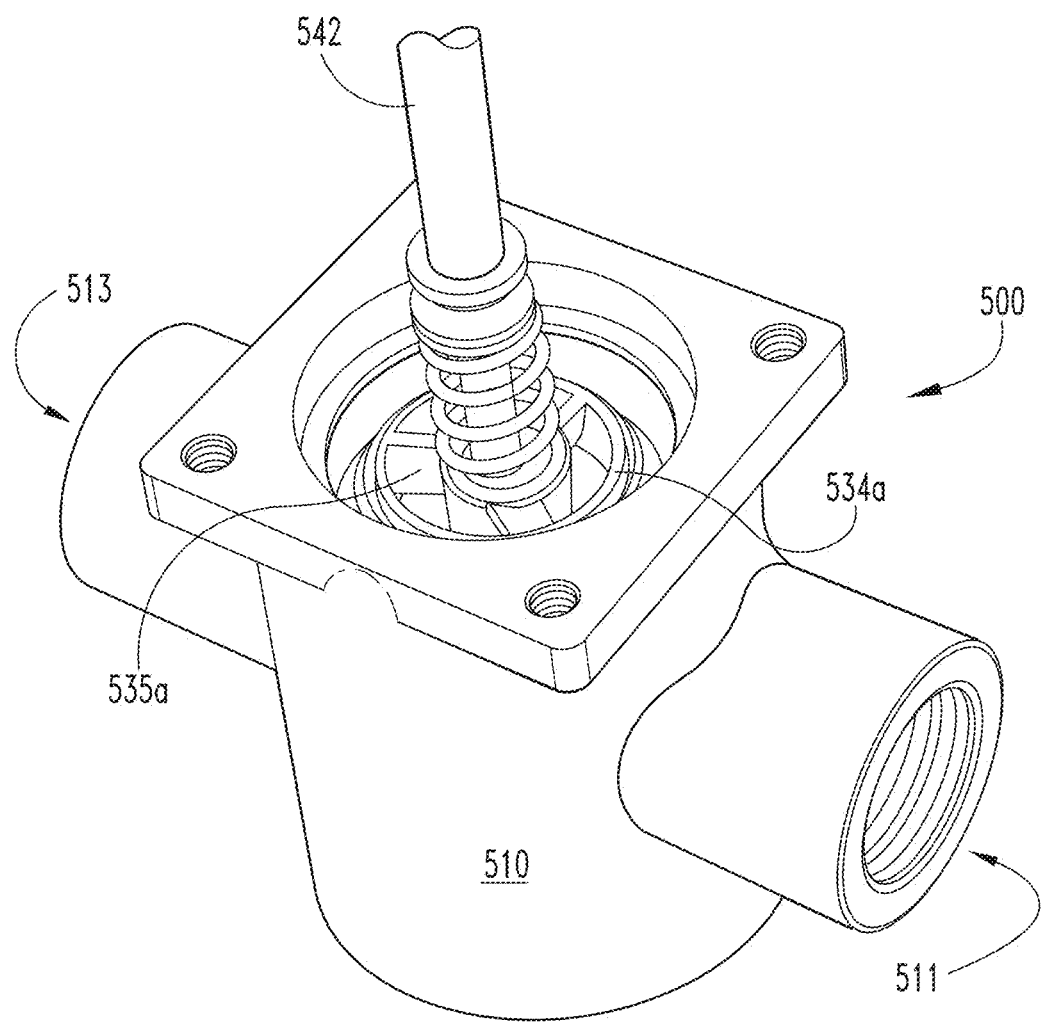
FIG. 11 is a perspective computer generated, partially cutaway view of a mixing valve assembly according to a further embodiment of the present invention.
Figure 12:
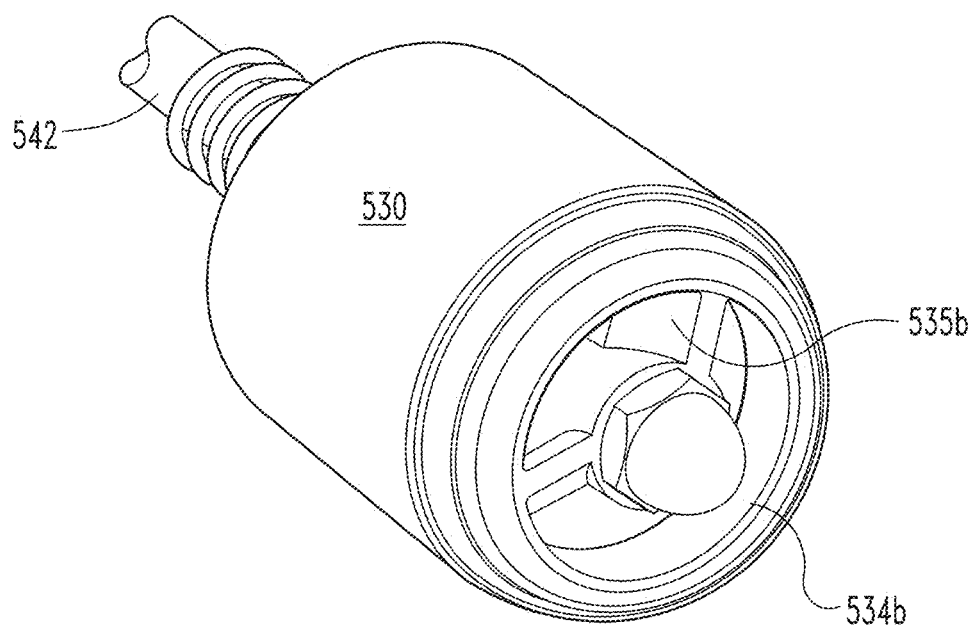
FIG. 12 is a perspective view of a portion of the mixing valve assembly depicted in FIG. 11.
Figure 13:
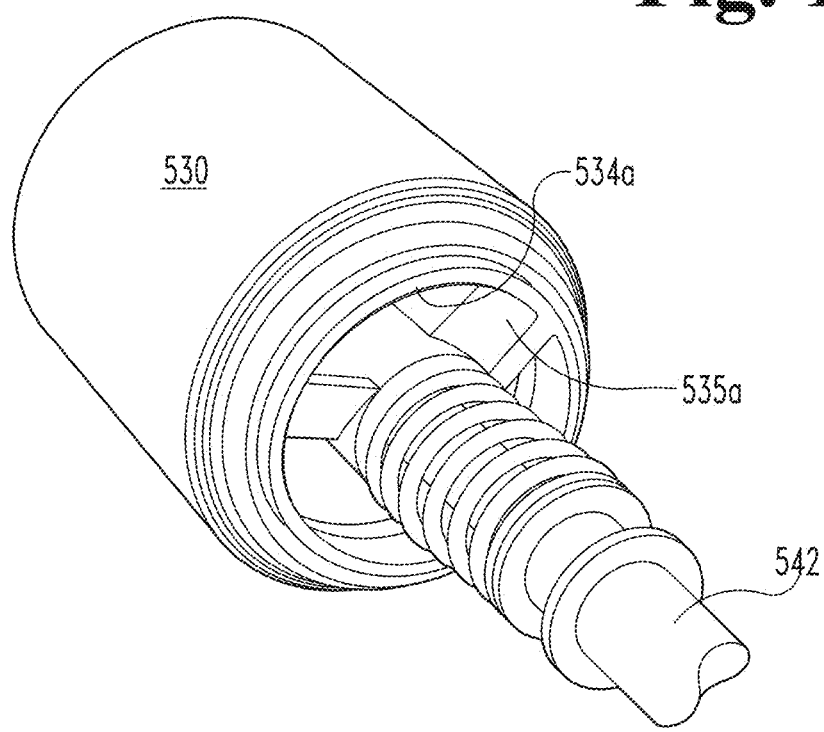
FIG. 13 is an alternate perspective view of the portion of the mixing valve assembly depicted in FIG. 12.

Depicted in FIGS. 11, 12 and 13 is a mixing valve assembly 500 according to still a further embodiment of the present invention. Mixing valve assembly 500 includes valve housing 510 (which includes a cold fluid inlet 511 and a hot fluid inlet 513), a piston 530, an upper turbulence generator 534a (which includes angled surfaces 535a), a lower turbulence generator 534b (which includes angled surfaces 535b), and a thermostat rod 542. In use, the hot fluid enters through hot fluid inlet 513 and, when the thermostat positions the piston to allow hot fluid to enter into the interior region of piston 530, flows past lower turbulence generator assembly 534b with angled surfaces 535b imparting a swirling motion to the hot fluid and flows past the upper turbulence generator assembly 534a with angled surfaces 535a, also imparting a swirling motion to the hot fluid. When the piston 530 is positioned by the thermostat to allow cold fluid to flow, the cold fluid mixes with the turbulent hot fluid (when the hot fluid is present).

Depicted in FIGS. 14, 15, and 16 is a mixing assembly 633 according to another embodiment of the present invention. Mixing assembly 633 is positioned within a piston, such as a piston similar to piston 530, to induce turbulence by swirling fluid as it exits (and/or enters) the interior portion of the piston in a similar fashion as described with respect to the embodiments depicted in FIGS. 10-13. Mixing assembly 633 includes strakes 634 and angled surfaces 635. In addition to providing increased strength to angled surfaces 635, strakes 634 assist in channeling the fluid toward angled surfaces 635 where the sudden change in direction as the fluid passes from strakes 634 to angled surface 635 assists in increasing the amount of turbulence generated by mixing assembly 633.

Still further embodiments the present invention include a piston 730 slidable within a static liner of a thermostatically controlled valve. Preferably, the slidable piston includes an exterior surface that functions as a metering land in cooperation with one or more slots within the liner. As this exterior surface (such as a smooth, generally cylindrical surface having an OD that is closely matched to the ID of the liner proximate to the slots) traverses axially past the slot, more or less fluid is permitted to flow from one of the fluid inlets into the interior of the piston.

Preferably this piston further includes a second metering land that cooperates with a second plurality of slits in the liner so as to the meter flow from the other fluid inlet. Preferably, this second metering land is on an exterior surface that is likewise a smooth, cylindrical surface closely matched to the ID of the liner proximate the second set of slits, but this second exterior surface is smaller in diameter than the first exterior surface.

In some embodiments, this piston is operably connected to a thermostat, such that the position of the piston within the liner is a function of the temperature of the fluid surrounding the thermostat. As the piston moves relative to the first and second slits, more flow is allowed from one set of slits, and less flow is allowed from a second set of slits. As discussed above, fluid from one set of slits passes into the interior of the piston. This flow exits at the opposite end of the piston, through one or more features that imparts swirl to the exiting flow. As this flow exits the piston, it combines with fluid metered past the second set of slits. With this arrangement, the swirling features impart turbulent mixing between the first fluid (which flowed within the piston) and the second fluid (which flowed between the second metering land and the second set of slits, but which remained external to the piston).

Figure 17:
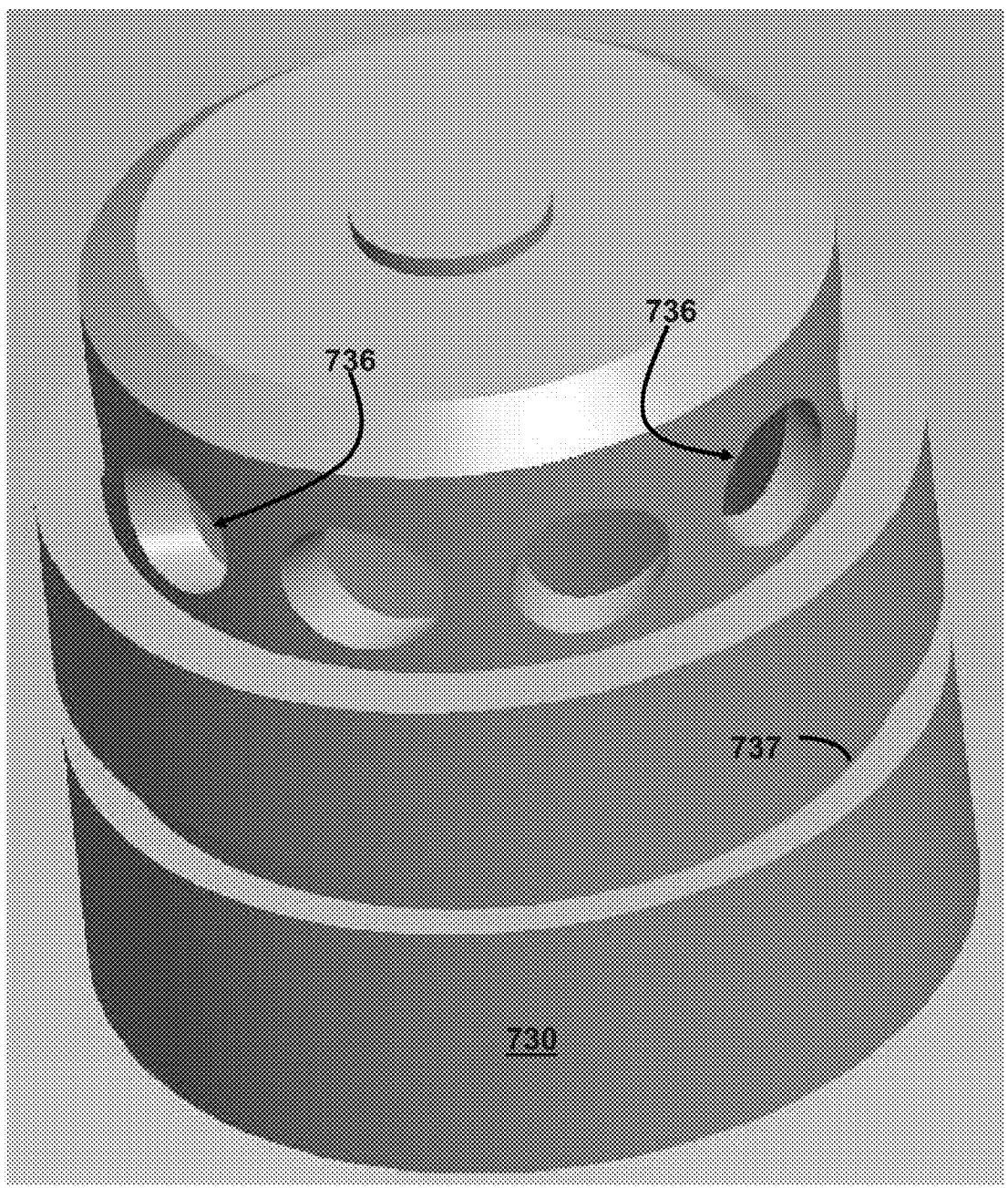
FIG. 17 is a perspective view of a mixing valve piston according to still a further embodiment of the present invention.

Depicted in FIG. 17 is a piston 730 according to a further embodiment of the present invention. Piston 730 can be used in mixing valve assemblies similar to those described above (e.g., mixing valve assemblies 100, 200, 300, 400, and 500) to create turbulence and mix the hot and cold fluid. Piston 730 includes angled holes 736 which impart a swirling motion to the fluid as the fluid moves radially outward from the interior of piston 730 through angled holes 736. An O-ring groove 737 receives and O-ring (not depicted) to help ensure that the flow of hot and cold fluid remains along the predetermined pathways. Similar to the pistons described above, piston 730 is connected to a thermostat (not depicted), which moves piston 730 in the axial direction to proportionally control the amount of hot and cold fluid flowing through the valve assembly, thereby controlling the temperature of the mixed fluid exiting the mixing valve assembly in which piston 730 is included.

Yet other embodiments the present invention pertain to a thermostatic mixing valve that includes one or more features for creating turbulence in flow of fluid after it has passed over the thermostat.

In one such embodiment, a thermostatically controlled mixing valve includes a sleeve and means for directing flow that cooperates to create turbulence and impart swirling to fluid that has flowed over the thermostat. In one embodiment, the sleeve and the directing means cooperate to create a pair of substantially concentric annular flow regions with a first annular flow region for directing fluid along the length of the thermostat in one direction, and providing fluid to the second annular flow region that substantially reverses the direction of flow, and in some embodiments further mixes the flow, and provides flow to the valve fluid outlet.

In some embodiments, the directing means is an integral portion of the body of the valve, such as a substantially cylindrical pocket that receives with in it the thermostat. In yet other embodiments, the directing means is a separate sleeve that is located within the body, and contains with in it and interior channel that receives the thermostat. In yet other embodiments, the separate sleeve is repeatedly separable from the valve, whereas in other embodiments the sleeve is adhered to the body in a substantially permanent manner, such as by gluing, brazing, welding, or the like.

In some embodiments, the sleeve surrounding the directing means is a separable piece of that is repeatedly detachable from the valve, and fits within a pocket of the valve, forming an interior chamber that receives both the thermostat and the directing means. In yet other embodiments, this sleeve can be adhered to the body as discussed above. In yet other embodiments, the sleeve is an integral part of the body, such as in those embodiments in which a plurality of turning vanes are integrally cast or machined into the valve body.

Figure 18:
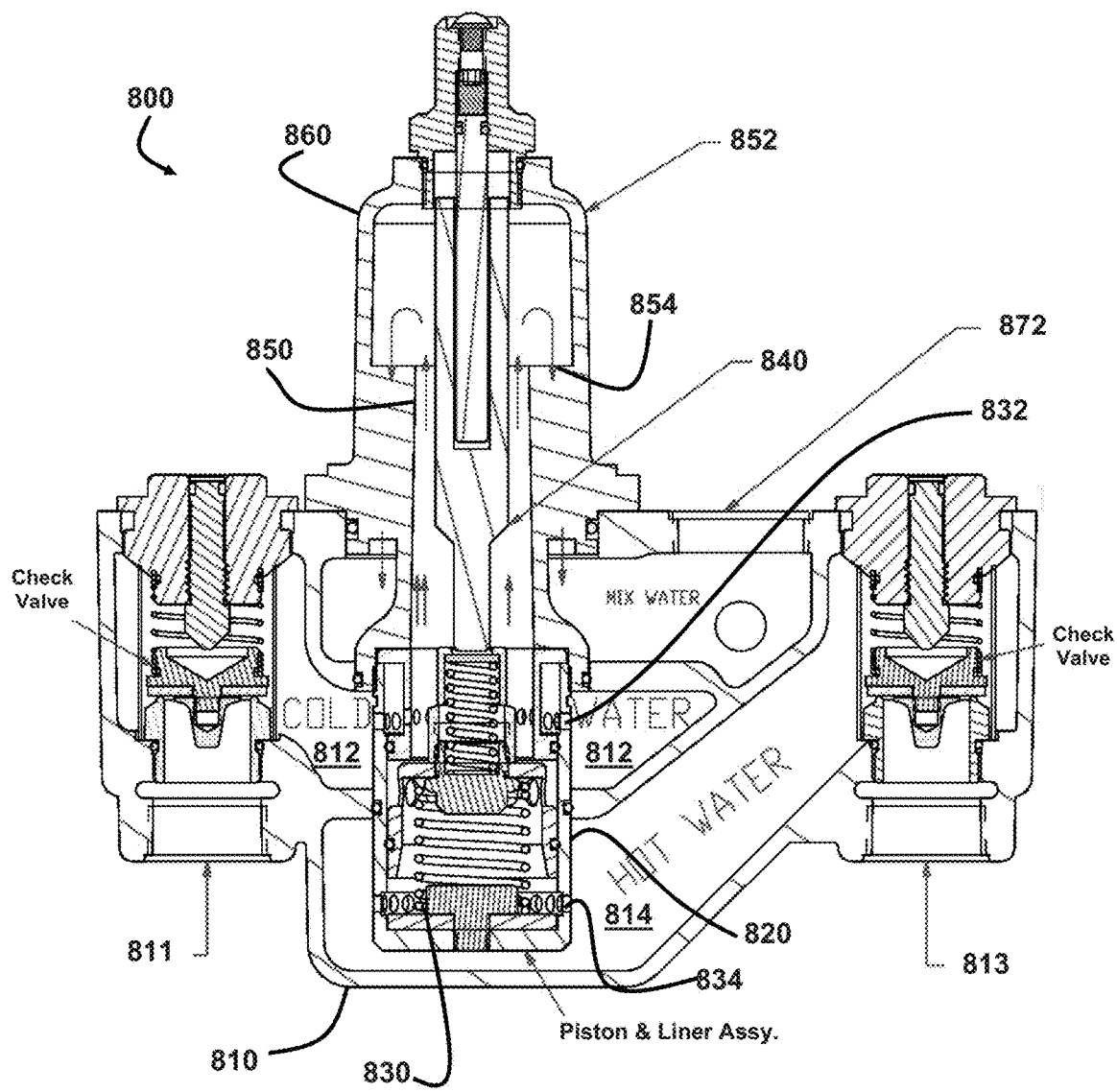
FIG. 18 is a front elevation sectional view of a mixing valve according to yet another embodiment of the present invention.
Figure 19:
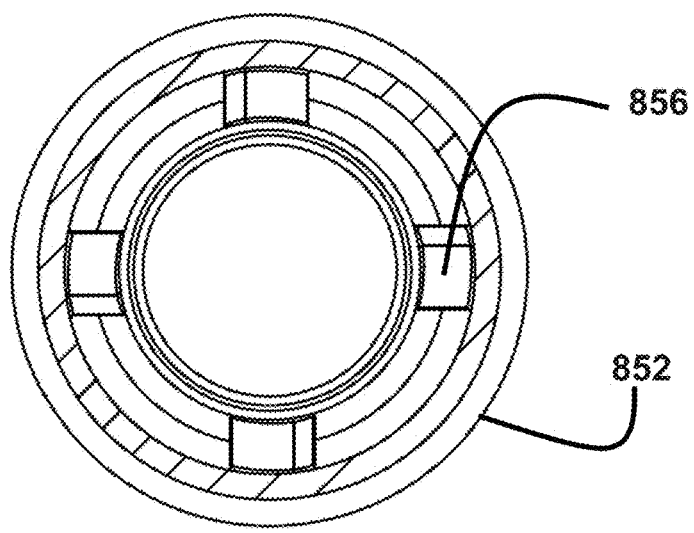
FIG. 19 is a sectional view of the mixing sleeve depicted in FIGS. 18 and 20 taken along line C-C in FIG. 20.
Figure 20:
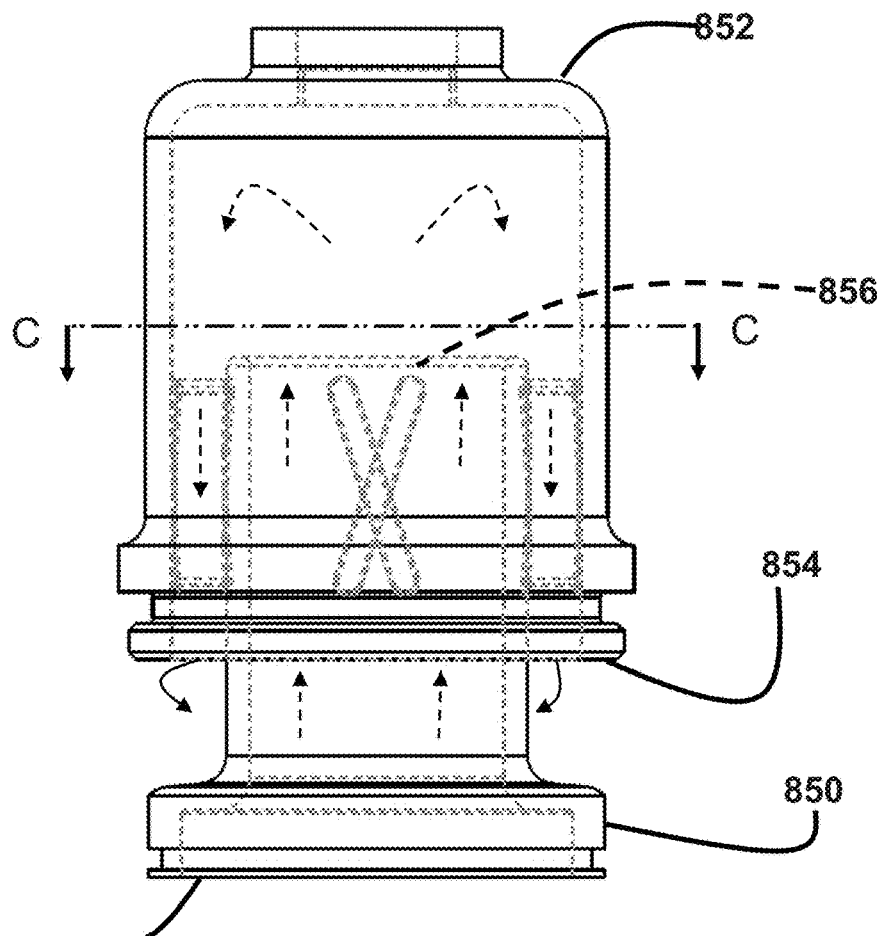
FIG. 20 is a front elevational view of the mixing sleeve and liner depicted in FIG. 18.

Depicted in FIGS. 18, 19, and 20 is a mixing valve assembly 800 according to still another embodiment of the present invention. Mixing valve assembly 800 includes valve housing 810, liner 820, piston 830, thermostat 840, mixing sleeve 850, mixing sleeve 852, housing 860, and mixed fluid outlet port 872. In use, hot fluid enters valve housing 810 through hot fluid inlet 813 and flows into hot fluid inlet chamber 814 where, if thermostat 840 has appropriately positioned piston 830 within liner 820, the hot fluid will enter the interior region of piston 830 after passing through passages 834. Cold fluid enters valve housing 810 through cold fluid inlet port 811 and enters cold fluid inlet chamber 812 where, if piston 830 has been appropriately positioned within liner 820 by thermostat 840, cold fluid will also enter the interior region of piston 830 after the cold fluid passes through passages 832. Although both hot and cold fluid may be present within the interior of piston 830, hot and cold fluid tend to resist mixing and can travel along the interior region of mixing sleeve 850 without being appreciably mixed.

After exiting piston 830, the hot and cold fluid pass through mixed fluid inlet 851 of mixing sleeve 850 and travel along the passage defined by the interior of mixing sleeve 850 and the exterior of thermostat 840. As the hot and cold fluid enter mixing sleeve 852, the hot and cold fluid reverse direction to exit out of the downstream end 854 of mixing sleeve 852. The reversal of direction of the hot and cold fluid within mixing sleeve 852 tends to assist in the mixing of the hot and cold fluids. In addition, as the hot and cold fluid approach the downstream end of mixing sleeve 852, angled support ribs 856 impart a swirling motion to the hot and cold fluid to induce turbulence and accelerate the mixing of the hot and cold fluid. The mixed hot and cold fluid continue along the passage defined by the exterior of mixing sleeve 850 and the interior of housing 860 until reaching the mixed fluid outlet port 872.

Figure 21:
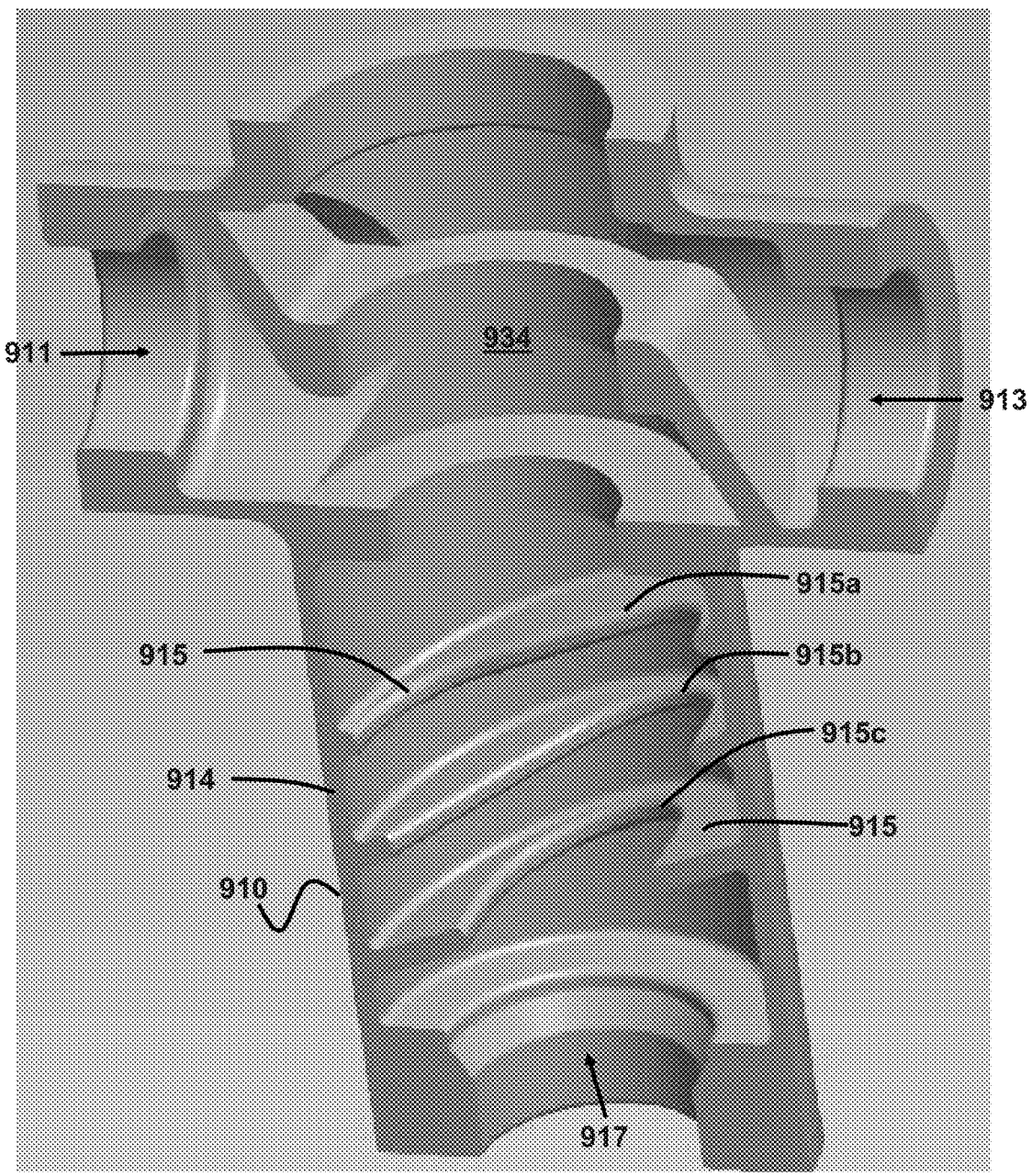
FIG. 21 is a perspective view of a mixing valve housing according to yet a further embodiment of the present invention.

Depicted in FIG. 21 is a valve housing 910 according to still another embodiment of the present invention. Valve housing 910 provides a housing into which liners, pistons and thermostats may be inserted to function similarly to the similar components of the valve assemblies described above (e.g., valve assemblies 100, 200, 300, 400, 500, and 800). For example, valve housing 910 includes a cold fluid inlet 911, a hot fluid inlet 913, a passage for operatively receiving a liner and piston assembly, and an aperture 917 through which a thermostat may extend to connect to the piston. Valve housing 910 also includes fins 915 that create turbulence as the hot and cold fluid travels from passage 934 toward aperture 917. Fins 915 extend inward from the outer cylindrical wall 914 in a direction that is approximately perpendicular to outer cylindrical wall 914, which creates an obstacle over which the hot and cold fluid must travel, thereby inducing turbulence and assisting in the mixing of the hot and cold fluid. Furthermore, the non-circular apertures formed by each fin segment 915a, 915b, and 915c, are rotationally displaced from one another in a progressive fashion to further impart a swirling motion to the hot and cold fluid, thereby increasing turbulence and assisting in the mixing of the hot and cold fluid.

It should be appreciated that the concepts of some embodiments may be used in conjunction with the concept of other embodiments as would be understood by one of ordinary skill in the art. For example, the concept of the fins 915 of valve housing 910 may be used in conjunction with the mixing valve assemblies 100, 200, 300, 400, 500, and 800. As another example, the concept of having a mixing sleeve 852 with angled support ribs 856 may be used in conjunction with valve assemblies 100, 200, 300, 400, and 500, and valve housing 810. Similarly, apparatuses similar to mixing assembly 633 and upper and lower turbulence generators 534a and 534b may be used in conjunction with mixing valve assemblies 100, 200, and 300.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An apparatus for controlling a mixing of multiple water streams, comprising:
    a body having hot and cold water inlets, a mixed water outlet, a water inlet chamber in fluid communication with at least one of the hot or cold inlets, and a water outlet chamber in fluid communication with the mixed water outlet;
    a thermostat being located within the water outlet chamber and a rod extending from said thermostat into the water inlet chamber;
    a mixing valve located within the water inlet chamber, said mixing valve including a water entrance and a water exit and a piston located within said body and being slidable relative to said body, said thermostat being operably coupled to said piston to control the position of said piston relative to said body; and
    a turbulence generating member located proximate to one of the water entrance or water exit, said turbulence generating member defining an aperture through which said rod passes, said turbulence generating member including a circular outer ring and a plurality of vanes extending radially from the aperture to the outer ring, said plurality of vanes being adapted and configured to impart a swirl to water passing thereover:
    wherein said turbulence generating member is a first turbulence generating member, said plurality of vanes is a first plurality of vanes, and said aperture is a first aperture, and which further comprises a second turbulence generating member located at the other of the water entrance or water exit, said second turbulence generating member defining a second aperture through which said rod passes, said second turbulence generating member including a second circular outer ring and a second plurality of vanes extending radially from the second aperture to the second outer ring, said second plurality of vanes being adapted and configured to impart a swirl to water passing thereover.

2. The apparatus of claim 1 wherein at least one of said first or second plurality of vanes are adapted and configured to turbulently swirl and radially flow fluid over the thermostat and around said thermostat.

3. The apparatus of claim 1 wherein the aperture is a central aperture, said first turbulence generating member includes an annular region between the circular outer ring and the central aperture, and said first plurality of vanes subdivide the annular region into annular sectors.

4. The apparatus of claim 1 wherein said first turbulence generating member is located proximate to the water entrance, and the water entrance receives hot water from the hot water inlet.

5. The apparatus of claim 1 wherein said first turbulence generating member is located proximate to the water entrance, and the water entrance receives cold water from the cold water inlet.

6. The apparatus of claim 1 wherein said first turbulence generating member is located proximate to the water exit, and the water exit provides hot water to the water outlet chamber.

7. The apparatus of claim 1 wherein said first turbulence generating member is located proximate to the water exit, and the water exit provides cold water to the water outlet chamber.

8. The apparatus of claim 1 wherein said first turbulence generating member and said second turbulence generating member are aligned coaxially by said rod.

9. The apparatus of claim 1 wherein said first turbulence generating member is located proximate to the water entrance, and the water entrance receives hot water from the hot water inlet, and said second turbulence generating member is located proximate to the water exit, and the water exit provides cold water to the water outlet chamber.

10. The apparatus of claim 1 wherein said first turbulence generating member is located proximate to the water entrance, and the water entrance receives cold water from the cold water inlet, and said second turbulence generating member is located proximate to the water exit, and the water exit provides hot water to the water outlet chamber.

11. The apparatus of claim 2 wherein said first turbulence generating member and said second turbulence generating member are aligned coaxially by said rod.

12. The apparatus of claim 11 wherein said first turbulence generating member is located proximate to the water entrance, and the water entrance receives hot water from the hot water inlet, and said second turbulence generating member is located proximate to the water exit, and the water exit provides cold water to the water outlet chamber.

13. The apparatus of claim 11 wherein said first turbulence generating member is located proximate to the water entrance, and the water entrance receives cold water from the cold water inlet, and said second turbulence generating member is located proximate to the water exit, and the water exit provides hot water to the water outlet chamber.

14. An apparatus for controlling a mixing of multiple water streams, comprising:
    a body having hot and cold water inlets, a mixed water outlet, a water inlet chamber in fluid communication with at least one of the hot or cold inlets, and a water outlet chamber in fluid communication with the mixed water outlet;
    a thermostat being located within the water outlet chamber and a rod extending from said thermostat toward the water inlet chamber;
    a mixing valve located within the water inlet chamber, said mixing valve including a water entrance and a water exit, said thermostat being operably coupled to said mixing valve to respond to the temperature of the water in the water outlet chamber; and
    a turbulence generating member located at one of the water entrance or water exit, said turbulence generating member defining an aperture through which said rod passes, said turbulence generating member including a plurality of vanes extending radially outward from the aperture, said plurality of vanes being adapted and configured to impart a swirl to water passing thereover;
    wherein said turbulence generating member is a first turbulence generating member, said plurality of vanes is a first plurality of vanes, and said aperture is a first aperture, and which further comprises a second turbulence generating member located at the other of the water entrance or water exit, said second turbulence generating member defining a second aperture through which said rod passes, said second turbulence generating member including a second plurality of vanes extending radially outward from the second aperture, said second plurality of vanes being adapted and configured to impart a swirl to water passing thereover.

15. The apparatus of claim 14 wherein at least one of said first or second plurality of vanes are adapted and configured to turbulently swirl and radially flow fluid over the thermostat and around said thermostat.

16. The apparatus of claim 14 wherein said first turbulence generating member includes a first circular outer ring, said first aperture is a first central aperture, said first plurality of vanes extend from the first central aperture to the first circular outer ring.

17. The apparatus of claim 14 wherein said first turbulence generating member is located at the water entrance, and the water entrance receives hot water from the hot water inlet.

18. The apparatus of claim 14 wherein said first turbulence generating member is located at the water entrance, and the water entrance receives cold water from the cold water inlet.

19. The apparatus of claim 14 wherein said first turbulence generating member is located at the water exit, and the water exit provides hot water to the water outlet chamber.

20. The apparatus of claim 14 wherein said first turbulence generating member is located at the water exit, and the water exit provides cold water to the water outlet chamber.

21. The apparatus of claim 14 wherein said first turbulence generating member and said second turbulence generating member are aligned coaxially by said rod.

22. The apparatus of claim 14 wherein said first turbulence generating member is located at the water entrance, and the water entrance receives hot water from the hot water inlet, and said second turbulence generating member is located at the water exit, and the water exit provides cold water to the water outlet chamber.

23. The apparatus of claim 14 wherein said first turbulence generating member is located at the water entrance, and the water entrance receives cold water from the cold water inlet, and said second turbulence generating member is located at the water exit, and the water exit provides hot water to the water outlet chamber.

24. The apparatus of claim 15 wherein said first turbulence generating member and said second turbulence generating member are aligned coaxially by said rod.

25. The apparatus of claim 24 wherein said first turbulence generating member is located proximate to the water entrance, and the water entrance receives hot water from the hot water inlet, and said second turbulence generating member is located proximate to the water exit, and the water exit provides cold water to the water outlet chamber.

26. The apparatus of claim 24 wherein said first turbulence generating member is located proximate to the water entrance, and the water entrance receives cold water from the cold water inlet, and said second turbulence generating member is located proximate to the water exit, and the water exit provides hot water to the water outlet chamber.

* * * * *